(12) United States Patent
Kamiya

(10) Patent No.: US 9,094,586 B2
(45) Date of Patent: Jul. 28, 2015

(54) FLASH BAND CORRECTION APPARATUS, FLASH BAND CORRECTION METHOD, AND IMAGE PICKUP APPARATUS

(71) Applicant: Sony Corporation, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 13/760,223

(22) Filed: Feb. 6, 2013

(65) Prior Publication Data

US 2013/0208149 A1    Aug. 15, 2013

(30) Foreign Application Priority Data

Feb. 13, 2012   (JP) .................................. 2012-028450

(51) Int. Cl.
*H04N 5/217*   (2011.01)
*H04N 5/235*   (2006.01)
*H04N 5/243*   (2006.01)

(52) U.S. Cl.
CPC ............. *H04N 5/217* (2013.01); *H04N 5/2354* (2013.01); *H04N 5/243* (2013.01)

(58) Field of Classification Search
CPC .. H04N 5/3532; H04N 5/2256; H04N 5/2354
USPC .......... 348/207.99, 222.1, 226.1, 229.1, 239, 348/241, 370, 371, 441, 443, 296; 382/236
See application file for complete search history.

(56) References Cited

U.S. PATENT DOCUMENTS

| | | | | |
|---|---|---|---|---|
| 2010/0110225 | A1* | 5/2010 | Wada et al. | 348/226.1 |
| 2011/0001849 | A1* | 1/2011 | Wada et al. | 348/241 |
| 2011/0273591 | A1* | 11/2011 | Fukushima | 348/239 |
| 2012/0026359 | A1* | 2/2012 | Fukushima et al. | 348/226.1 |

FOREIGN PATENT DOCUMENTS

| | | |
|---|---|---|
| JP | 2007-306225 | 11/2007 |
| JP | 2010-135921 | 6/2010 |

* cited by examiner

*Primary Examiner* — Lin Ye
*Assistant Examiner* — Chriss Yoder, III
(74) *Attorney, Agent, or Firm* — Frommer Lawrence & Haug LLP; William S. Frommer

(57) ABSTRACT

A flash band correction apparatus includes a flash band detection unit and a frame rate conversion unit. The flash band detection unit is configured to detect a start line and an end line of a flash band in a frame on the basis of a difference in an exposure period for each line of an image signal output for each frame at a predetermined frame rate by an image pickup element with a rolling shutter system. The flash band is an unevenness in brightness level for each line which is generated in the frame due to flash light. The frame rate conversion unit is configured to determine a combination of the frames of the image signal before a frame rate is converted on the basis of the start line and the end line and convert the frame rate to 1/n thereof.

6 Claims, 16 Drawing Sheets

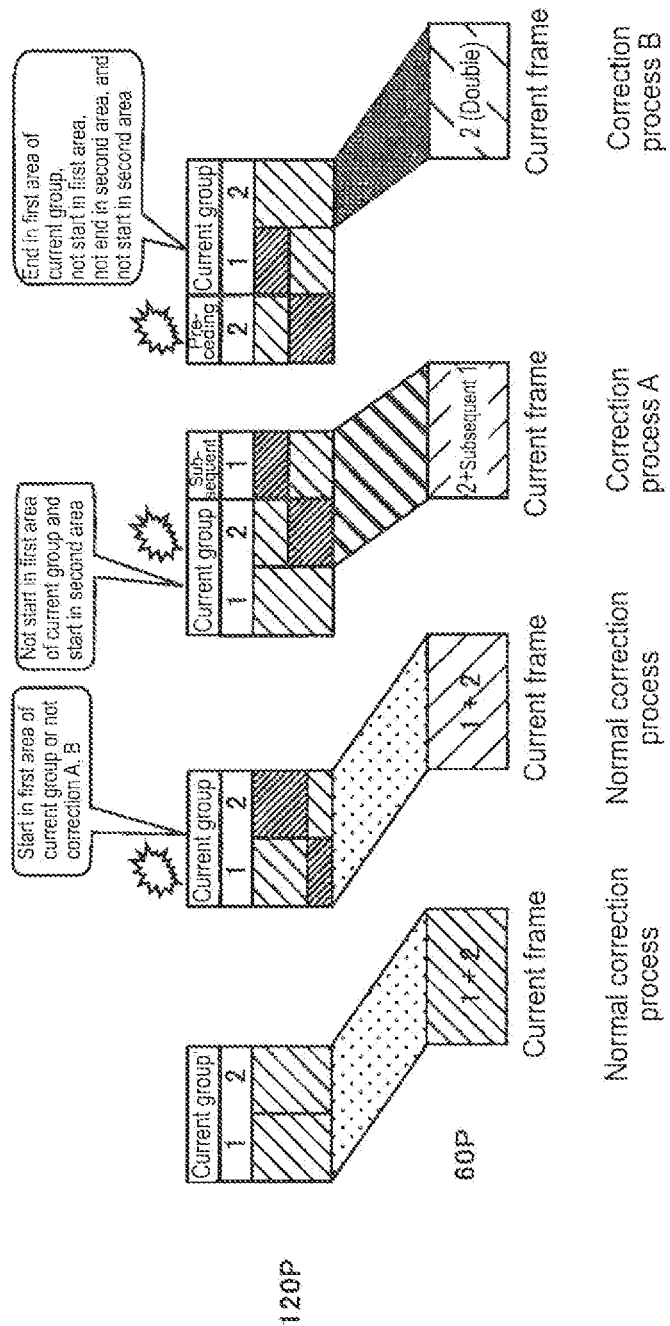

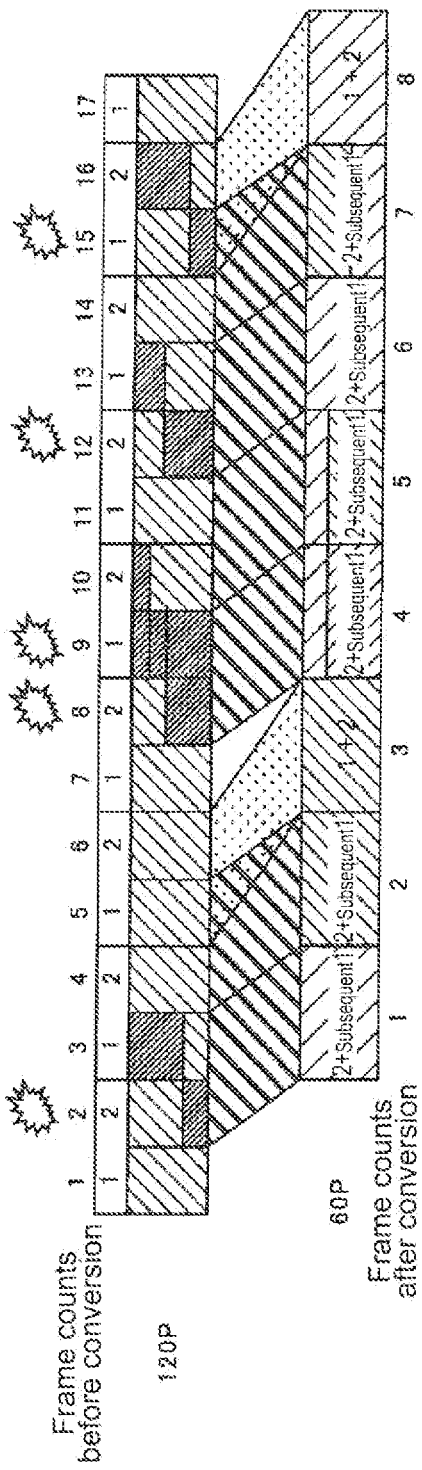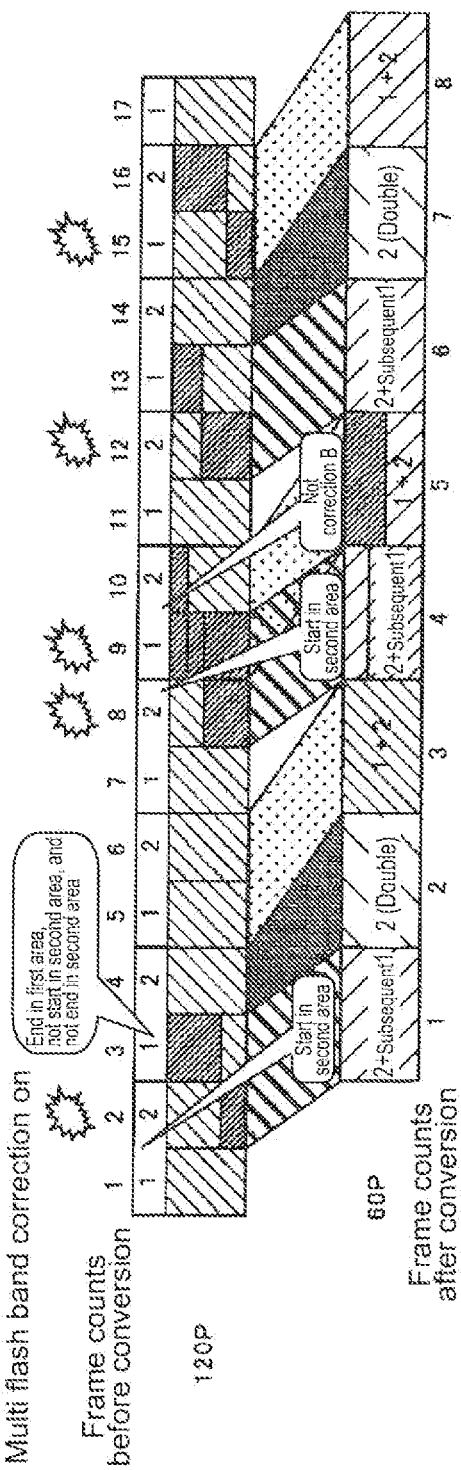

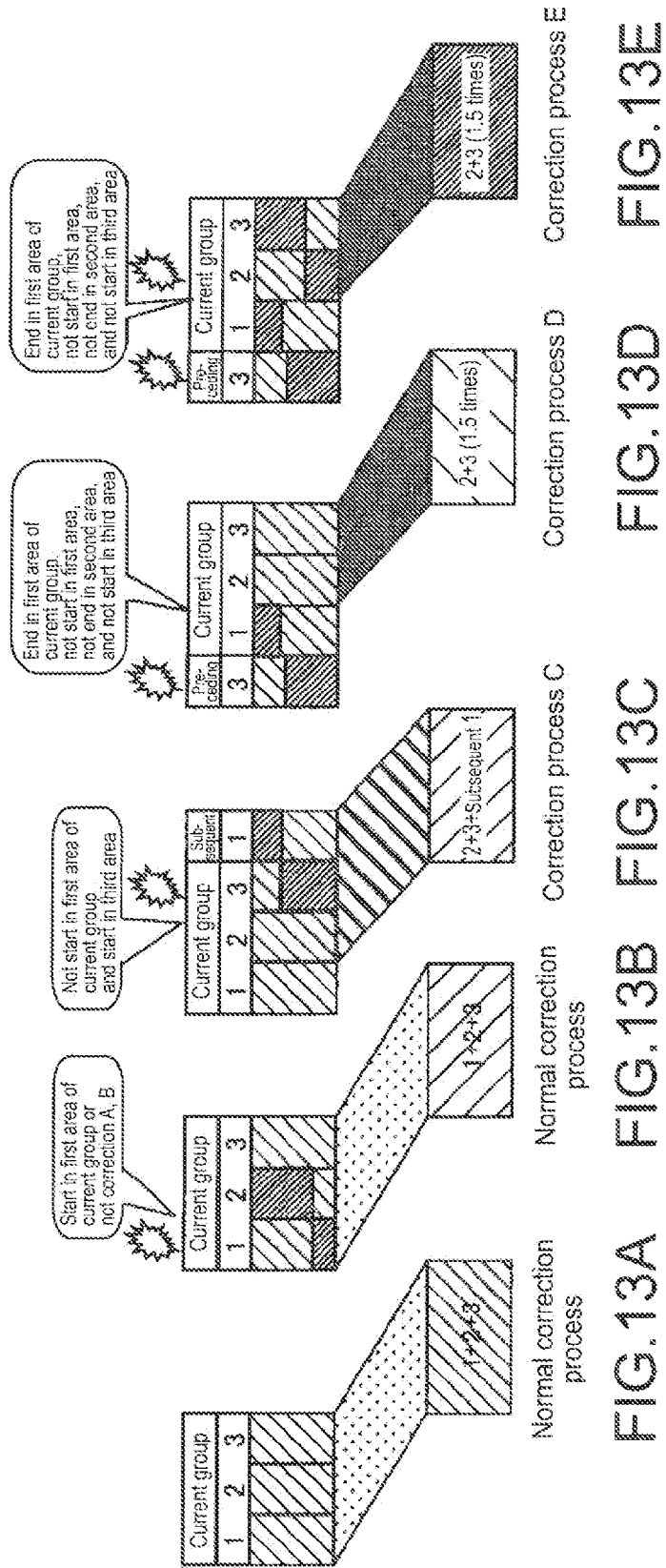

FLASH BAND CORRECTION APPARATUS, FLASH BAND CORRECTION METHOD, AND IMAGE PICKUP APPARATUS

BACKGROUND

The present disclosure relates to a flash band correction apparatus, a flash band correction method, and an image pickup apparatus which are applied to the case where a flash band is detected which is generated in a frame of image data taken by irradiating a subject with intense light (hereinafter, referred to as "flash"), for example.

In related art, there has been known an image pickup element used for a camera, which uses a rolling shutter system for starting exposure sequentially for each horizontal line (hereinafter, referred to as "line") and reading an image signal sequentially for each line to output a frame. In an image pickup element with the rolling shutter system, exposure time periods vary by line. Therefore, if a flash or the like is used during a shorter time period than a frame rate during which the image pickup element reads an image signal, a band-like unevenness (flash band) in a brightness level may be generated for each frame of the image displayed. Hereinafter, a brightness level is abbreviated as "level", and a flash band is abbreviated as "FB".

FIGS. 18A and 18B are explanatory diagrams showing an example of an FB generated in a frame in related art.

FIG. 18A shows a relationship between a flash and frames output by an image pickup element with a vertical axis representing the number of lines in a vertical direction and a horizontal axis representing time (seconds).

The image pickup element outputs image signals read in a direction from an upper portion toward a lower portion of the frame. Then, a flash is used across the first frame and the second frame.

FIG. 18B is a diagram showing an example of images of the frames.

As shown in FIG. 18A, if the flash is used across the first frame and the second frame, on a line in a lower portion of the first frame, an unevenness of a level is generated due to the flash. On the other hand, for the second frame, before an image signal of a line in a lowermost portion of the first frame is read, an image signal of a line in an upper portion of the second frame is read. For this reason, on the line in the upper portion of the second frame, the unevenness of the level is generated due to the flash.

If the FB is generated in the frames as described above, in the first frame, a lower portion of the image is brightened, and in the second frame, an upper portion of the image is brightened. If the FBs are generated over a plurality of frames, the FBs appear when a moving image is reproduced or when a still image is captured, so the quality of the image deteriorates.

In related art, to suppress the influence exerted on an image by a frame in which the FB is generated, a correction is carried out so that the unevenness of the level is eliminated, or a corresponding frame itself is removed, for example. As a precondition of those countermeasures, a method of detecting existence or nonexistence of the FB has been considered.

As the method of detecting the FB, Japanese Patent Application Laid-open No. 2010-135921 discloses a method of using a first condition for detecting that an area in which the level of pixels is increased exists in a lower portion of a first frame and an upper portion of a second frame. In this method, to detect the FB, a decrease in the second frame in level of the area, the level of which is increased in the first frame, is set as a second condition.

As another method, Japanese Patent Application Laid-open No. 2007-306225 discloses a method of detecting a frame in which an exposure is saturated from among continuous frames taken through an appropriate exposure.

SUMMARY

Incidentally, in an image that is taken with a rolling scanning system, an FB is often generated. To correct the FB, there is a method in which two or more frames are overlapped with each other, thereby making the FB inconspicuous. However, as one image, a temporal axis is extended, so a feeling of strangeness may be generated in an image obtained by capturing a subject that strenuously moves. Further, to correct the image in which the FB is generated in real time, an algorism for performing the detection and correction of the FB becomes very difficult. Furthermore, an erroneous detection or an erroneous correction for the FB is caused in some cases.

In addition, by the method of detecting the FB disclosed in Japanese Patent Application Laid-open No. 2010-135921, it may be impossible to detect the case where a start line and an end line of the FB is in one frame and the case where the FB is continuous across three or more frames. Further, by the method of detecting the FB disclosed in Japanese Patent Application Laid-open No. 2007-306225, when a position of a light source or a moving body with a high brightness is varied, the varied moving body or light source may lead to an erroneous detection of the FB.

In view of the above-mentioned circumstances, it is desirable to appropriately correct, at a time when a frame rate is converted to 1/n thereof, the FB generated in the frame before the conversion.

According to an embodiment of the present disclosure, there is provided a flash band correction method including detecting a frame in which a flash band occurs by a start line and an end line of the flash band on the basis of a difference in an exposure period for each line of an image signal output for each frame at a predetermined frame rate by an image pickup element with a rolling shutter system, the flash band being an unevenness in brightness level for each line which is generated in the frame due to flash light, and correcting the flash band on the basis of the start line and the end line of the flash band detected and convert the frame rate to 1/n thereof.

According to the present disclosure, when the frame in which the flash band occurs is detected, the flash band is corrected, and the frame rate is converted to 1/n thereof, with the result that it is possible to provide a desirable image in which the flash band is inconspicuous in the frame corrected.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 6A to 6D are explanatory diagrams each showing an example of a correction process at a time when the frame rate is converted from 120 P to 60 P by the frame rate conversion unit according to a second embodiment of the present disclosure;

FIGS. 8A and 8B are explanatory diagrams each showing an example in which the frame rate conversion unit according to the second embodiment of the present disclosure performs a correction process for a multi FB;

FIGS. 13A to 13E are explanatory diagrams each showing an example of a correction process at a time when the frame rate conversion unit according to a fourth embodiment of the present disclosure converts the frame rate from 180 P to 60 P;

DETAILED DESCRIPTION OF EMBODIMENTS

Hereinafter, best modes for carrying out the present disclosure (hereinafter, referred to as embodiments) will be described. It should be noted that the description will be given in the following order.

1. First embodiment (example of process for correcting single FB when frame rate is converted from 120 P to 60 P)

2. Second embodiment (example of process for correcting multi FB when frame rate is converted from 120 P to 60 P)

3. Third embodiment (example of process for correcting single FB when frame rate is converted from 180 P to 60 P)

4. Fourth embodiment (example of process for correcting multi FB when frame rate is converted from 180 P to 60 P)

5. Modified example

1. First Embodiment

Example of Process for Correcting Single FB when Frame Rate is Converted from 120 P to 60 P First, with reference to FIGS. 1 to 5, a description will be given on an example of a process for an FB correction according to a first embodiment of the present disclosure in the case where a flash is used in one frame. In this embodiment, a description will be given on examples of a flash band correction apparatus 10 (hereinafter, abbreviated as FB correction apparatus 10) that detects an FB generated in the frame, corrects the FB detected, and converts a frame rate, and an image pickup apparatus 1 provided with the FB correction apparatus 10. The FB correction apparatus 10 implements a flash band correction method that is performed in cooperation with internal blocks to be described later. In the description below, the generation of an FB in one frame or across two frames when one flash is used in one frame of image data is referred to as a "single flash band (hereinafter, abbreviated as single FB)".

Figure 1:
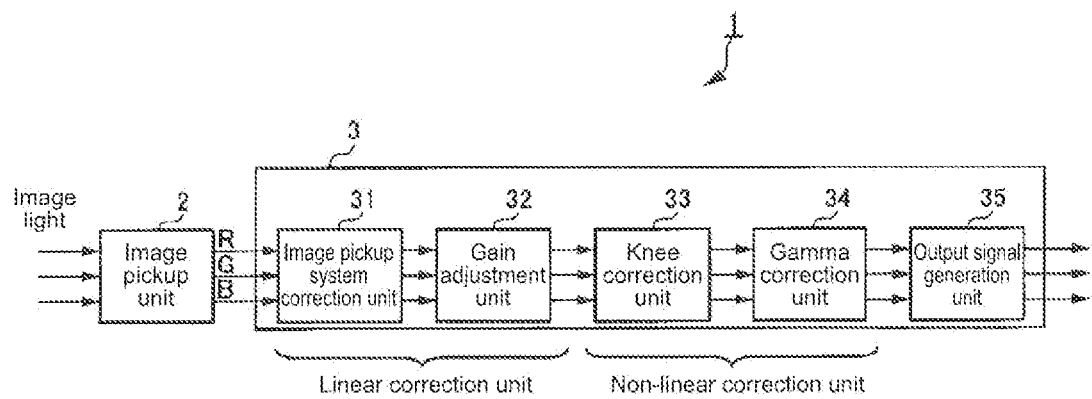
FIG. 1 is a block diagram showing an example of the structure of an image pickup apparatus according to a first embodiment of the present disclosure.

FIG. 1 is a block diagram showing an example of the internal structure of the image pickup apparatus 1.

First, the image pickup apparatus 1 that uses a general camera system will be described. A technology according to the present disclosure is also applied to an image pickup process method used by the image pickup apparatus 1.

The image pickup apparatus 1 is provided with an image pickup element with a rolling shutter system, a lens system, and the like and is provided with an image pickup unit 2 that outputs an image signal of three primary colors of RGB and an image signal processing circuit 3 that performs a predetermined process for an image signal received from the image pickup unit 2. For the image pickup element, for example, a CMOS (complementary metal oxide semiconductor) image sensor is used. It should be noted that the image pickup element, the lens system, and the like provided to the image pickup unit 2 are not shown in the figure.

The image pickup element performs exposure of image light of a subject incident via the lens system for each pixel and output an image signal for each line. A difference of exposure time periods for each line of the image signal output by the image pickup element at a predetermined frame rate for each frame may cause an FB, which is an unevenness of brightness levels for each line which is generated in the frame due to flash light. With the use of an A/D (analog/digital) conversion unit (not shown), the image pickup unit 2 converts the image signal output from the image pickup element from an analog signal to a digital signal, to generate an image signal quantized.

The image signal processing circuit 3 is provided with an image pickup system correction unit 31 and a gain adjustment unit 32. The image pickup system correction unit 31 corrects a defect of the image signal received from the image pickup unit 2. The gain adjustment unit 32 adjusts a gain or the like of the image signal in accordance with an instruction of an operation unit (not shown) which is given by a user or the like. Here, the image pickup system correction unit 31 and the gain adjustment unit 32 are used in combination as a linear correction unit that performs a linear correction of the image signal.

Further, the image signal processing circuit 3 is provided with a knee correction unit 33 that performs a knee correction of the image signal and a gamma correction unit 34 that performs a gamma correction of the image signal. The knee correction unit 33 and the gamma correction unit 34 are used in combination as a non-linear correction unit that performs a non-linear correction of the image signal. Furthermore, the image signal processing circuit 3 is provided with an output signal generation unit 35 that generates, as an output signal, the image signal to be written in an external recording medium (flash memory, HDD, or the like) received from the gamma correction unit 34.

The image signal of the three primary colors of RGB which is output by the image pickup unit 2 is subjected to a linear process by the image pickup system correction unit 31 and the gain adjustment unit 32 and is then subjected to a level compression by the knee correction unit 33 in order to be set in a predetermined signal standard. Further, to correspond to a gamma of a monitor to which the image signal is output, the gamma correction unit 34 performs the gamma correction. After that, the output signal generation unit 35 outputs an image signal converted into an ultimate output form to the monitor (not shown) or the like.

Figure 2:
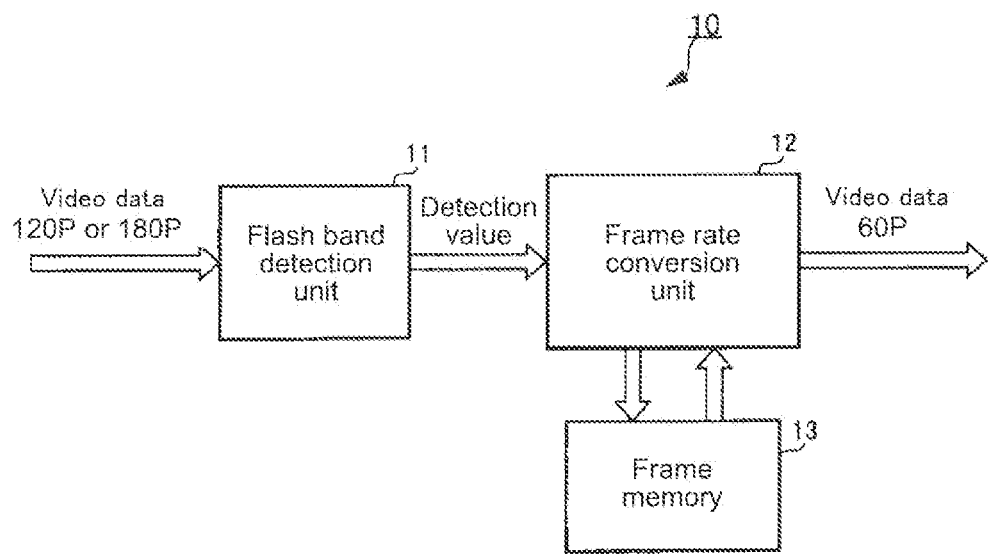
FIG. 2 is a block diagram showing an example of the internal structure of an FB correction apparatus according to the first embodiment of the present disclosure.

FIG. 2 is a block diagram showing an example of the internal structure of the FB correction apparatus 10.

The FB correction apparatus 10 is provided with a flash band detection unit 11 (hereinafter, abbreviated as FB detection unit 11) that detects the FB from the frame of the image data input from the image pickup unit 2 and a frame rate conversion unit 12 that determines a combination of frames of the image signal before conversion of the frame rate on the basis of a start line and an end line of the FB and converts the frame rate of the image data to 1/n (n: integer of 2 or more) thereof. In addition, the FB correction apparatus 10 is provided with a frame memory 13 in which the frame rate conversion unit 12 writes or reads the image data.

As described above, the FB detection unit 11 detects the existence and nonexistence of the FB in the frame and the start line and the end line. Therefore, the FB correction apparatus 10 only has to be provided in a former stage of the linear correction unit or the non-linear correction unit. At this time, the linear correction unit or the non-linear correction unit disposed to be subsequent to the FB correction apparatus is used as an image pickup unit that applies a predetermined process to the image data including the frame which has been subjected to the 1/n-times conversion.

The image data input to the FB detection unit 11 is a progressive signal, and a frame rate thereof is set to 120 frame/second (hereinafter, 120 P) or 180 frame/second (hereinafter, 180 P), for example. The image data that has been subjected to frequency conversion for 120 P to ½ thereof by the frame rate conversion unit 12 is the progressive signal, and the frame rate becomes 60 frame/second (hereinafter, 60 P). Further, as will be described later, the image data that has been subjected to the frequency conversion for 180 P to ⅓ thereof by the frame rate conversion unit 12 is also the progressive signal, and the frame rate becomes 60 P.

Here, the fact that when a read time period of the image data is set to be shorter than a time period of one frame, the FB can be reduced from the image data read is well known. On the basis of the fact, if the image data is read at a double frame rate of the original frame rate, the probability of generation of the FB in the image data becomes 50%.

Therefore, by combining two frames taken at the double frame rate to each other, the generation of the FB can be reduced. However, even if the two frames are combined, the probability of the generation of the FB just becomes 50%, and the FB is generated in the frames combined with the remaining probability of the generation. By a method to be explained below, the two frames combined are changed depending on a generation condition of the FB, thereby making it possible to reduce the FB.

Figure 3:
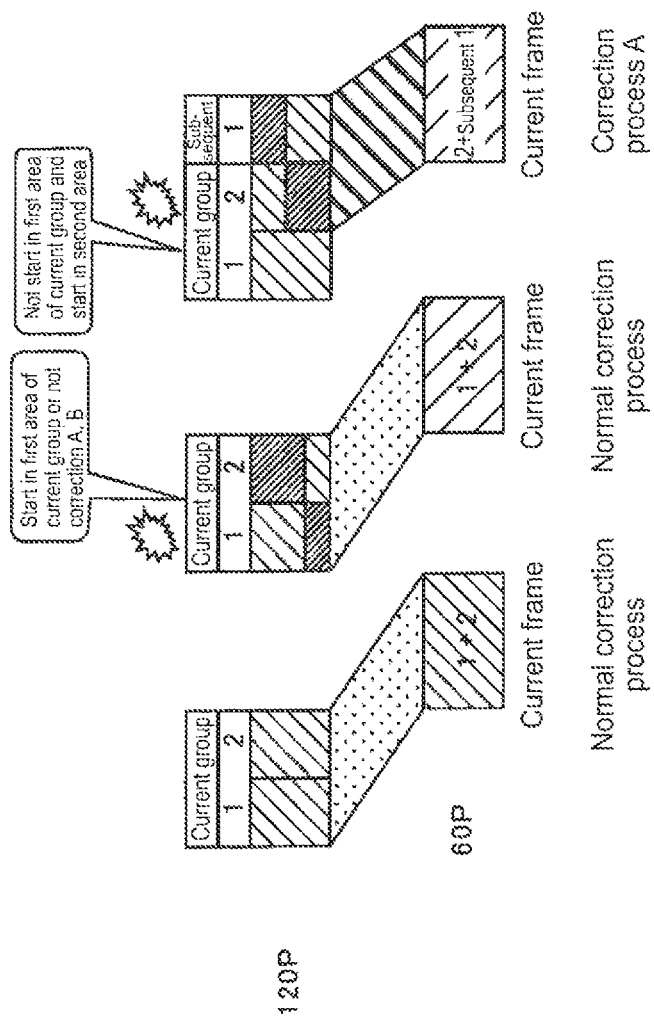
FIGS. 3A to 3C are explanatory diagrams each showing an example of a correction process at a time when a frame rate conversion unit according to the first embodiment of the present disclosure converts a frame rate from 120 P to 60 P.

Next, with reference to FIGS. 3 to 5, a description will be given on an example of a process of the FB correction performed by taking the 1st to 17th frames in the image data input to the FB correction apparatus 10. In the following description, a set of a plurality of frames is referred to as a "group", and an n-th frame included in the group is represented as an "n-th area". Further, to convert the frame rate from 120 P to 60 P in real time, one frame of 60 P as a frame rate after the conversion is referred to as a "current frame". In addition, a plurality of frames at a frame rate before the conversion, which precedes by one frame at the frame rate after the conversion by the frame rate conversion unit 12, are referred to as a "current group", and frames at the frame rate before the conversion, which follow the current group, are referred to as a "subsequent group". Furthermore, frames at the frame rate before the conversion, which precede the current group, are referred to as a "preceding group".

Here, a first area at 120 P, which is the frame rate before the conversion, preceding the current frame by one frame and a second area subsequent to the first area are referred to as the "current group". The first and second areas at 120 P preceding the current group by one frame of 60 P are referred to as the "preceding group". Further, the first and second areas at 120 P subsequent to the current group by one frame of 60 P are referred to as the "subsequent group", as will be described later.

FIGS. 3A to 3C are explanatory diagrams each showing an example of a correction process at a time when the frame rate conversion unit 12 converts the frame rate from 120 P to 60 P. FIG. 3A shows an example of averaging the first and second areas of the current group. FIG. 3B shows an example of averaging the first and second areas of the current group in the case where the flash is used in the first area. FIG. 3C shows an example of a correction process A according to the first embodiment.

The FB detection unit 11 detects that the FB starts or ends in the current group. At this time, the frame rate conversion unit 12 writes at least image data included in the current group into the frame memory 13, performs the correction process to be described below with respect to the image data read from the frame memory 13 on the basis of the area in which the FB starts or ends, which is detected by the FB detection unit 11, and thus converts the frame rate.

Here, conditions for correcting the FB by the frame rate conversion unit 12 according to the first embodiment are defined as follows.

(1) Normal Correction Process

The frame rate conversion unit 12 normally performs a process of averaging the first and second areas of the current group which appear alternately in the frames at 120 P (FIG. 3A).

Further, in the case where the FB starts in the first area of the current group, and the state is not as shown in FIG. 3C, the frame rate conversion unit 12 performs a process of averaging the first and second areas of the current group at 120 P as the current frame at 60 P (FIG. 3B).

(2) Correction Process A

In the case where the FB starts in the second area, and the FB does not start in the first area, the frame rate conversion unit 12 performs the correction process A according to the first embodiment (FIG. 3C).

At this time, out of the frames at 120 P, in the case where the FB does not start in the first area of the current group, and the FB starts in the second area of the current group, as the current frame at 60 P, the second area of the current group at 120 P and the first area of the subsequent group are averaged.

Thus, in the case where the FB does not exist in the current group or in the case where the FB starts in the first area of the current group, the frame rate conversion unit 12 according to the first embodiment averages the first and second areas of the current group. In addition, in the case where the FB starts in the second area of the current group, the second area of the current group and the first area of the subsequent group are averaged. Then, the frame rate of the image data is converted to ½ thereof.

Figure 4:
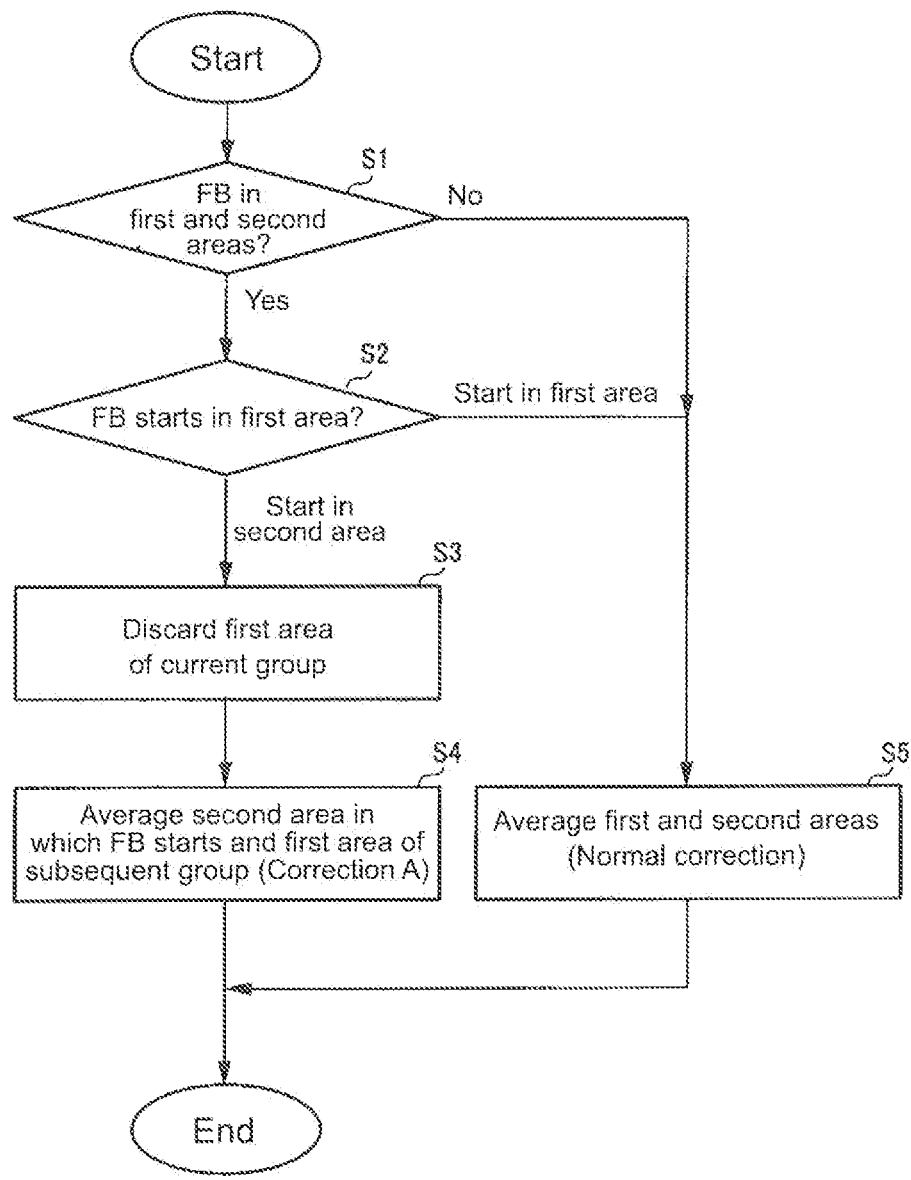
FIG. 4 is a flowchart showing an example of a normal correction process and a correction process A performed by the frame rate conversion unit according to the first embodiment of the present disclosure.

FIG. 4 is a flowchart showing an example of the normal correction process and the correction process A performed by the frame rate conversion unit 12.

First, the frame rate conversion unit 12 determines whether the FB exists or not in the first and second areas of the current group at 120 P (Step S1). If the FB does not exist in the first and second areas, the normal correction process for averaging the first and second areas of the current group is performed (Step S5), and the process is terminated.

If the FB exists in the first and second areas of the current group, the frame rate conversion unit 12 determines whether the FB starts in the first area of the current group (Step S2). If the FB starts in the first area, the normal correction process is performed (Step S5), and the process is terminated.

If the FB does not start in the first area, it is possible to determine that the FB starts in the second area of the current group. At this time, the first area of the current group is discarded (Step S3), the correction process A for averaging the second area of the current group in which the FB starts and the first area of the subsequent group is performed (Step S4), and then the process is terminated.

Figure 5A:
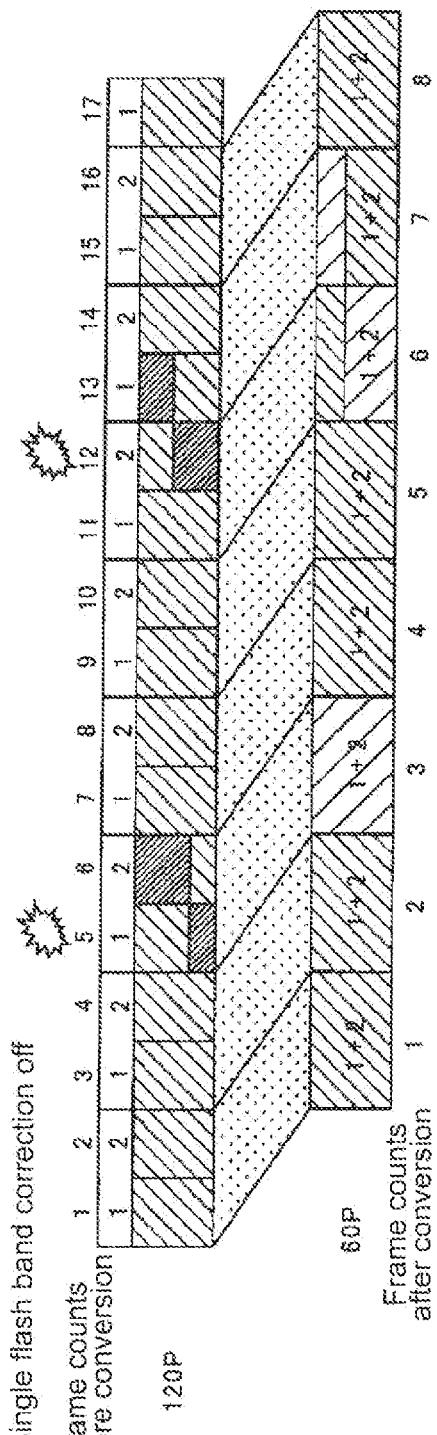
FIGS. 5A and 5B are explanatory diagrams each showing an example of a process for correcting a single FB by the frame rate conversion unit according to the first embodiment of the present disclosure.
Figure 5B:
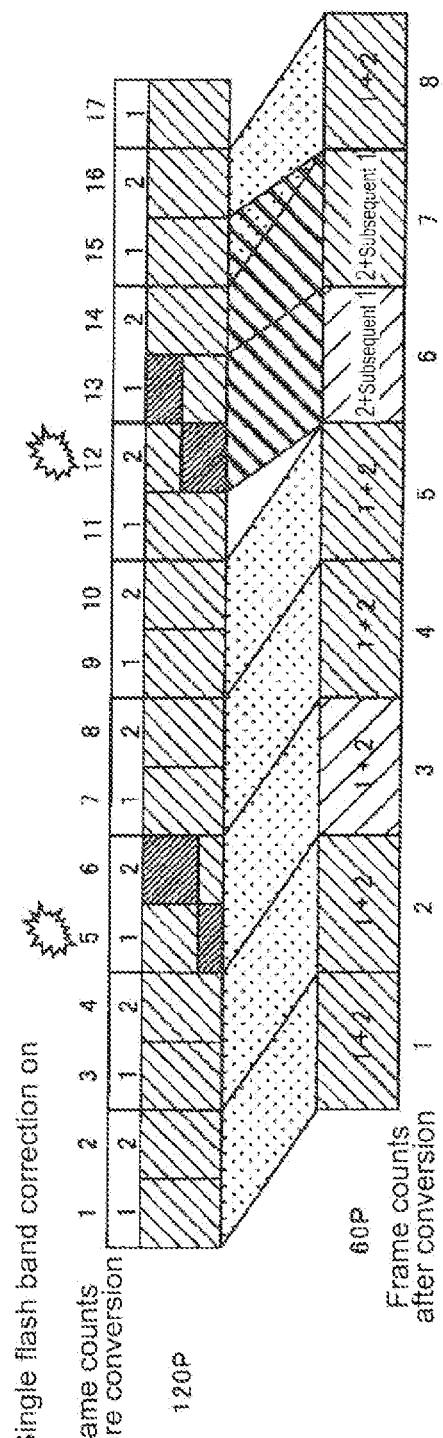

FIGS. 5A and 5B are explanatory diagrams each showing an example of a process for correcting a single FB by the frame rate conversion unit 12. FIG. 5A shows a correction example for a single FB in related art. FIG. 5B shows a correction example for a single FB according to the first embodiment. As shown in FIG. 5A, the frame rate conversion unit 12 sets the correction process for the single FB according to the first embodiment to off (invalid) and performs the normal FB correction process.

As shown in FIG. 5A, out of the frames at 120 P, the flash is used in the 5th frame and the 12th frame, and the single FB starts therein. In related art, the FB is corrected by averaging image data of continuous two frames included in the current group, e.g., the 1st and 2nd frames and the 3rd and 4th frames. Therefore, the 3rd frame of the image data that has been subjected to the frame rate conversion is a frame obtained by averaging the 5th and 6th frames of the image data before the frequency conversion. However, in the 12th frame of the frames at 120 P, the 11th frame is averaged, so the FB is generated in the 6th and 7th frames of the image data after the conversion.

Here, as shown in FIG. 5B, the FB correction process by the frame rate conversion unit 12 is set to be on (valid). At this time, the 6th frame at 60 P is a frame obtained by discarding the 11th frame and averaging the 12th and 13th frames. Further, the 7th frame at 60 P is a frame obtained by averaging the 14th and 15th frames at 120 P, and the 8th frame at 60 P is a frame obtained by averaging the 15th and 16th frames at 120 P. After that, the 9th frame and frames subsequent thereto (not shown) at 60 P correspond to frames obtained by sequentially averaging a set of the 17th and 18th frames and sets of subsequent frames at 120 p.

By the FB correction apparatus 10 according to the first embodiment described above, when the frame rate conversion unit 12 converts the frame rate of the image data from 120 P to 60 P, it is possible to correct the single FB generated in the frame before conversion in real time. At this time, in addition to the normal correction process, when the FB detection unit 11 detects that the flash is used in the second area of the current group at 120 P, and the FB starts, the frame rate conversion unit 12 performs the correction process A for changing the set of frames used for the correction of the FB. As a result, it is possible to efficiently suppress the generation of the FB from the frame at 60 P after the conversion and make the FB inconspicuous.

Further, because the frame rate conversion unit 12 determines the correction process on the basis of the FB generated in the frames of the current group at 120 P, it is possible to perform the FB correction with a delay of one frame at 60 P and thus perform the process almost in real time (with a little delay). Thus, at the time when the frequency of the image data at an HFR (high frame rate) is converted to be an LFR (low frame rate), a temporal axis of the frame after the conversion does not vary extremely, and the real time performance is maintained. Furthermore, if the FB detection unit 11 erroneously detects the FB, and therefore the frame rate conversion unit 12 erroneously corrects the FB, the frame which is to be erroneously corrected is very little. Thus, it is possible to output the image data by the FB correction apparatus 10 while maintaining the continuity of the image data which is continuously input to the FB correction apparatus 10 at the frame rate before the conversion.

2. Second Embodiment

Example of Process for Correcting Multi FB when Frame Rate is Converted from 120 P to 60 P Next, with reference to FIGS. 6 to 9, a description will be given on an example of a process for an FB correction according to a second embodiment of the present disclosure in the case where a flash is used for a plurality of frames in a row. In the following description, parts corresponding to those of FIG. 1 described in the first embodiment are denoted by the same reference numerals, and the detailed description of those will be omitted. Further, the flash is used for a plurality of frames of image data in a row (hereinafter, referred to as "multi flash"), and an FB generated over three or more frames is referred to as a "multi flash band (hereinafter, abbreviated as "multi FB")".

When the multi flash is used, even if the correction process according to the first embodiment described above is performed, the multi FB appears. In view of this, the frame rate conversion unit 12 according to the second embodiment selectively uses the case where two frames are combined and the case where one frame is used as it is, to cope with the multi FB.

FIGS. 6A to 6D are explanatory diagrams each showing an example of a correction process at a time when the frame rate is converted from 120 P to 60 P by the frame rate conversion unit 12. FIGS. 6A and 6B each show an example of the normal correction process. FIG. 6C shows an example of the correction process A according to the first embodiment described above. FIG. 6D shows an example of a correction process B according to the second embodiment.

Conditions for correcting the FB by the frame rate conversion unit 12 according to the second embodiment are defined as follows. Here, the normal correction process shown in FIG. 6A and the correction process A shown in FIG. 6C are the same as the processes performed by the frame rate conversion unit 12 according to the first embodiment, so the description thereof will be omitted.

(1) Normal Correction Process

In the case where the FB starts in the first area of the current group, and the state is not as shown in FIGS. 6C and 6D, the frame rate conversion unit 12 performs a process for averaging the first and second areas of the current group at 120 P as the current frame at 60 P (FIG. 6B).

(2) Correction Process B

In the case where the FB does not start in the first area, the FB ends in the first area, the FB does not end in the second area, and the FB does not start in the second area, the frame rate conversion unit 12 performs the correction process B according to the second embodiment. By the correction process B, as the current frame at 60 P, the second area of the current group is extended to be double (FIG. 6D).

Therefore, in addition to the process performed by the frame rate conversion unit 12 according to the first embodiment, in the case where the FB starts in the second area of the preceding group and ends in the second area of the current group, the frame rate conversion unit 12 according to the second embodiment averages the first and second areas of the current group. Further, in the case where the FB starts in the second area of the current group and ends in the first area of the subsequent group, the frame rate conversion unit 12 averages the second area of the current group and the first area of the subsequent group. In the case where the FB starts in the second area of the preceding group and ends in the first area of the current group, the second area of the subsequent group is extended to be double. Then, the frame rate of the image data is converted to ½ thereof.

Figure 7:
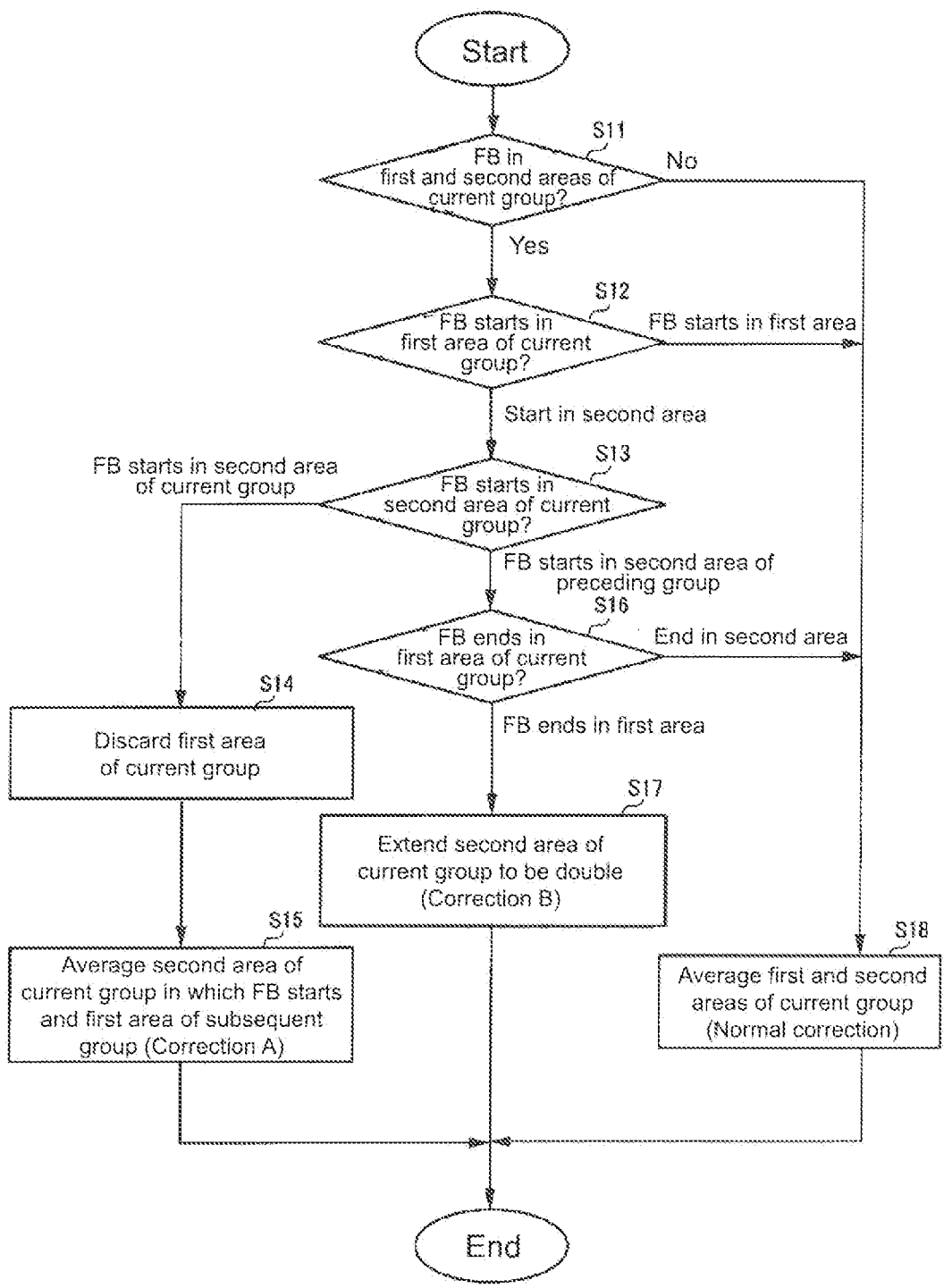
FIG. 7 is a flowchart showing an example of performing the normal correction process, the correction process A, and a correction process B by the frame rate conversion unit according to the second embodiment of the present disclosure.

FIG. 7 is a flowchart showing an example of performing the normal correction process and the correction processes A and B by the frame rate conversion unit 12.

First, the frame rate conversion unit 12 determines whether the FB exists in the first and second areas of the current group at 120 P (Step S11). If the FB does not exist in the first and second areas, the normal correction process for averaging the first and second areas is performed (Step S18), and then the process is terminated.

If the FB exists in the first and second areas of the current group, the frame rate conversion unit 12 determines whether the FB starts in the first area of the current group or not (Step S12). If the FB starts in the first area of the current group, the normal correction process is performed (Step S18), and then the process is terminated.

If the FB does not start in the first area of the current group, the frame rate conversion unit 12 determines whether the FB starts in the second area of the current group or not (Step S13). If the FB starts in the second area of the current group, the first area of the current group is discarded (Step S14), and the correction process A for averaging the second area of the current group in which the FB starts and the first area of the subsequent group (Step S15), and then the process is terminated.

In Step S13, in the case where the frame rate conversion unit 12 determines that the FB starts in the second area of the preceding group, the frame rate conversion unit 12 determines whether the FB ends in the first area of the current group or not (Step S16). In the case where the FB ends in the first area of the current group, the correction process B for extending the second area of the current group to be double (Step S17), and then the process is terminated.

In Step S16, in the case where the FB ends in the second area of the current group, the normal correction process is performed (Step S18), and the process is terminated.

FIGS. 8A and 8B are explanatory diagrams each showing an example in which the frame rate conversion unit 12 according to the second embodiment performs the correction process for the multi FB. FIG. 8A shows a correction example for the single FB as in the first embodiment with respect to the multi FB. FIG. 8B shows a correction example for the multi FB according to the second embodiment.

As shown in FIG. 8A, out of the frames at 120 P, flashes are used in the 2nd, 8th, 9th, 12th, and 15th frames, and the FBs start. In each of the 8th and 9th frames, the multi FB occurs. When the frame rate conversion unit 12 performs the correction process according to the first embodiment, the FB that starts in the 2nd frame at 120 P is averaged with the 3rd frame at 120 P through the correction process A.

Further, the FB that starts in the 8th frame at 120 P is averaged with the 9th frame at 120 P through the correction process A. However, the FB also occurs in the 9th frame at 120 P, and the FB ends in the 10th frame at 120 P. At this time, the 4th frame at 60 P is equal to a frame obtained by averaging the 8th and 9th frames, and in the 5th frame at 60 P, the FB generated in the 10th frame at 120 P appears. It should be noted that in the 4th frame at 60 P, an FB is caused by a difference in brightness between the first flash light (eight frame at 120 P) and the second flash light (9th frame at 120 P). However, as compared to the FB generated in a frame at 60 P in the case where the flash light exists in one frame of continuous two frames at 120 P, and the flash light does not exist in the other frame, an FB that is generated when the flash light is generated twice in a row gives a smaller influence visually. Therefore, the FB generated when the flash light is generated twice in a row may not have to be corrected. If such an FB is generated, extremely high brightness (flash light) in an image of a video camera is compressed by a high brightness compression circuit or the like which is continuously provided in the FB correction apparatus 10, and thus the difference in brightness becomes inconspicuous.

Then, the 12th and 13th frames at 120 P are averaged to be converted to the 6th frame at 60 P, but in the 7th frame at 60 P, the FB generated in the 15th frame at 120 P appears. In addition, the 8th frame at 60 P becomes a frame obtained by averaging the 15th and 16th frames at 120 P.

Here, as shown in FIG. 8B, the correction process for the multi FB according to the second embodiment is set to be on (valid), and the multi FB is corrected. At this time, the frames at 120 P are corrected, and the frames at 60 P are generated as will be described below.

The 1st frame at 60 P is a frame obtained by averaging the 2nd and 3rd frames at 120 P through the correction process A, because the FB starts in the 2nd frame at 120 P.

The 2nd frame at 60 P is a frame obtained by extending the 4th frame at 120 P to be double through the correction process B.

The 3rd frame at 60 P is a frame obtained by averaging the 5th and 6th frames at 120 P through the normal correction process.

The 4th frame at 60 P is a frame obtained by averaging the 8th and 9th frames at 120 P through the correction process A. Here, the 7th frame at 120 P is discarded.

The 5th frame at 60 P is a frame obtained by averaging the 9th and 10th frames at 120 P through the normal correction process. Here, the 11th frame at 120 P is discarded.

The 6th frame at 60 P is a frame obtained by averaging the 12th and 13th frames at 120 P through the correction process A.

The 7th frame at 60 P is a frame obtained by extending the 14th frame at 120 P to be double through the correction process B.

The 8th frame at 60 P is a frame obtained by averaging the 15th and 16th frames at 120 P through the normal correction process.

Figure 9:
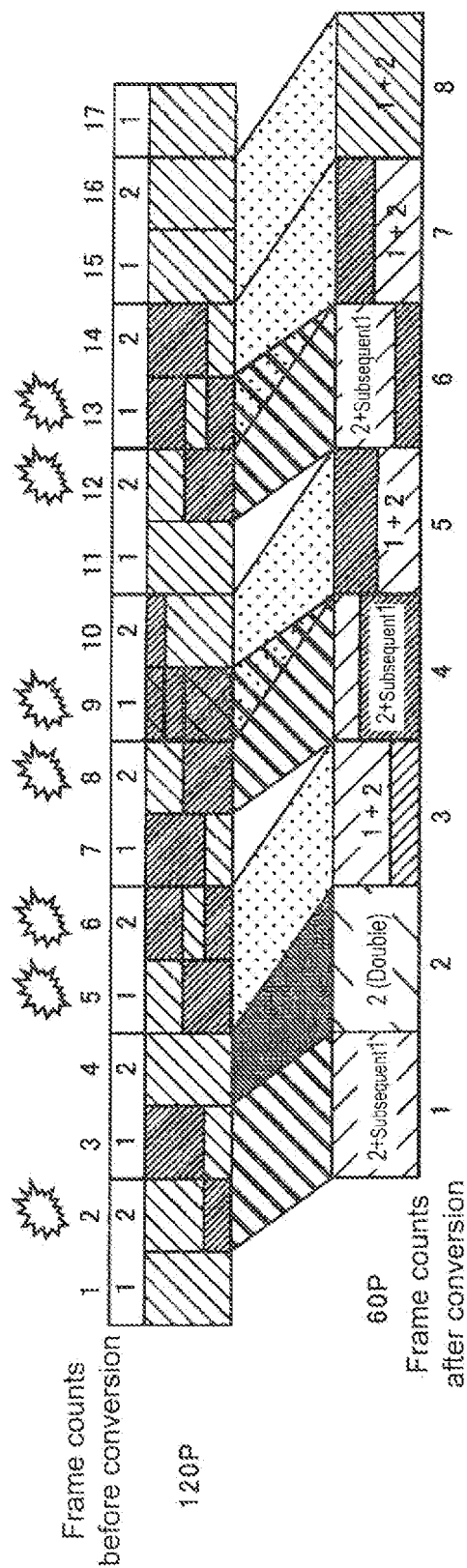
FIG. 9 is an explanatory diagram showing another example in which the frame rate conversion unit according to the second embodiment of the present disclosure performs a correction process for the multi FB.

FIG. 9 is an explanatory diagram showing another example in which the frame rate conversion unit 12 according to the second embodiment performs the correction process for the multi FB. The upper part of FIG. 9 shows an example of the frames at 120 P, and the lower part of FIG. 9 shows an example of the frames at 60 P.

As shown in FIG. 9, the flash is used in each of the 2nd, 5th, 6th, 8th, 9th, 12th, and 13th frames at 120 P. Therefore, the FB occurs in each of the 2nd and 3rd frames, the 5th to 10th frames, and the 12th to 14th frames at 120 p.

First, the FB starts in the 2nd frame at 120 P, so the 1st frame at 60 P is a frame obtained by averaging the 2nd and 3rd frames at 120 P through the correction process A.

The 2nd frame at 60 P is a frame obtained by extending the 4th frame at 120 P to be double through the correction process B.

Further, the FB starts in the 5th frame at 120 P and ends in the 6th frame, so the 3rd frame at 60 P is obtained by averaging the 5th and 6th frames at 120 P through the normal correction process.

Furthermore, the FB starts in the 6th frame at 120 P and ends in the 7th frame, so the 7th frame at 120 P is discarded.

Next, the FB starts in the 8th frame at 120 P and ends in the 10th frame. Here, in the 9th frame, the FBS that start in the 8th and 9th frames are overlapped.

At this time, the 4th frame at 60 P is a frame obtained by averaging the 8th and 9th frames at 120 P through the correction process A.

In the 5th frame at 60 P, the 9th and 10th frames at 120 P are averaged through the normal correction process, and the 11th frame at 120 P is discarded.

Next, the FB starts in the 12th frame at 120 P and ends in the 14th frame.

At this time, the 6th frame at 60 P is a frame obtained by averaging the 12th and 13th frames at 120 P through the correction process A.

The 7th frame at 60 P is a frame obtained by averaging the 13th and 14th frames at 120 P through the normal correction process.

After that, the 8th frame at 60 P is a frame obtained by averaging the 15th and 16th frames at 120 P through the normal correction process.

By the FB correction apparatus 10 according to the second embodiment described above, in the case where the flash is used in the second area of the preceding group, and the FB ends in the first area of the current group, the frame rate conversion unit 12 performs the correction process B for extending the second area of the current group to be double. In the case where the FB starts in the first area of the current group, which is not in the state where the correction process A or B is performed, the normal correction process is performed. Thus, by performing the correction process B in addition to the correction process A according to the first embodiment, in the process for converting the frame rate from 120 P to 60 P, it is possible to perform the correction for the multi FB in real time and make the FB generated in the frames at 60 P inconspicuous.

In this case, as in the case of the FB correction apparatus 10 according to the first embodiment described above, to perform the real-time process while suppressing a delay in one frame at 60 P at a maximum, the determination of the start or end of the FB is not also performed for the subsequent group. Therefore, it is possible to correct the FB at a high speed on the basis of the frames of the current group or the preceding group at 120 P.

3. Third Embodiment

Example of Process for Correcting Single FB when Frame Rate is Converted from 180 P to 60 P Next, with reference to FIGS. 10 to 12, a description will be given on an example of an FB correction process according to a third embodiment of the present disclosure in the case where a flash is used in one frame.

Figure 10:
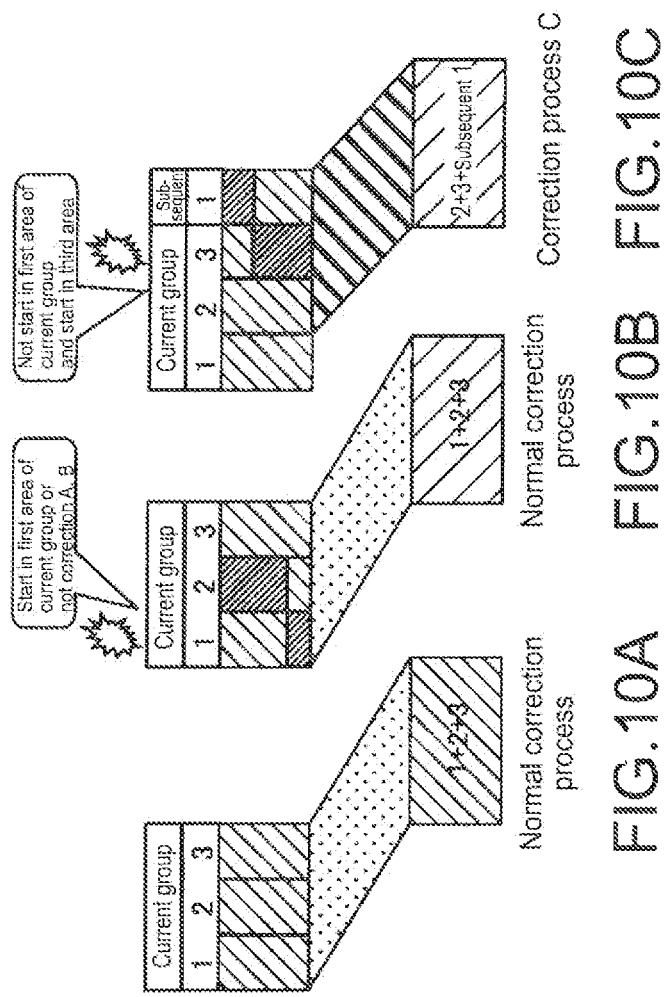
FIGS. 10A to 10C are explanatory diagrams each showing an example of a correction process at a time when the frame rate conversion unit according to a third embodiment of the present disclosure converts the frame rate from 180 P to 60 P.

FIGS. 10A to 10C are explanatory diagrams each showing an example of a correction process at a time when the frame rate conversion unit 12 according to the third embodiment converts the frame rate from 180 P to 60 P. FIG. 10A shows an example in which a first area and a second area that follows the first area are averaged in related art. FIG. 10 B shows an example in which when the flash is used in the first area, the first area is averaged with the second area. FIG. 10 C shows an example in which a correction process according to the third embodiment is performed.

Here, the first to third areas at 180 P, which is a frame rate before conversion, preceding the current frame at 60 P by one frame, are referred to as a "current group". Further, first to third areas at 180 P preceding the current group by one frame of 60 P are referred to as a "preceding group". Furthermore, first to third areas at 180 P subsequent to the current group by one frame of 60 P to be described later are referred to as a "subsequent group".

Conditions for correcting the FB by the frame rate conversion unit 12 according to the third embodiment are defined as follows.

(1) Normal Correction Process

The frame rate conversion unit 12 normally performs a process of averaging the first to third areas which appear repeatedly alternately in the frames at 180 P (FIG. 10A).

Further, in the case where the FB starts in the first area of the current group, and the state is not as shown in FIG. 10C, the frame rate conversion unit 12 performs a process of averaging the first to third areas of the current group at 180 P as the current frame at 60 P (FIG. 10B).

(2) Correction Process C

Here, in the case where the FB starts in the third area of the current group, and the FB does not start in the first area of the current group, the frame rate conversion unit 12 performs a correction process C according to the third embodiment (FIG. 10C). At this time, the frame rate conversion unit 12 performs a process of averaging the second and third areas of the current group at 180 P and the first area of the subsequent group as the current frame at 60 P.

Therefore, in the case where the FB is not generated in the current group or in the case where the FB starts in the first or second area of the current group, the frame rate conversion unit 12 according to the third embodiment averages the first to third areas of the current group. In addition, in the case where the FB starts in the third area of the current group and ends in the first area in the subsequent group, the frame rate conversion unit 12 averages the second and third areas of the current group and the first area of the subsequent group. Then, the frame rate of the image data is converted to ⅓ thereof.

Figure 11:
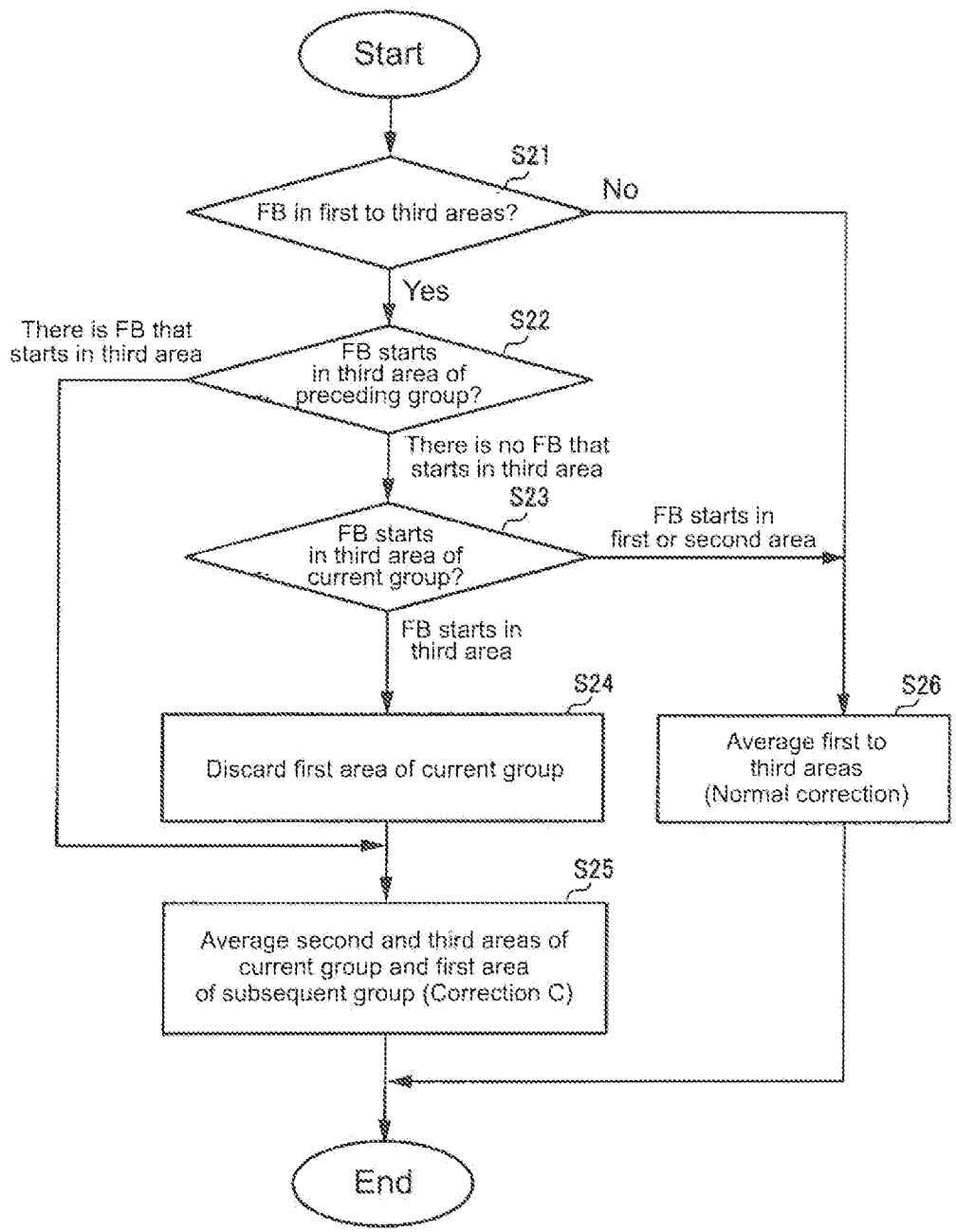
FIG. 11 is a flowchart showing an example in which the frame rate conversion unit according to the third embodiment of the present disclosure performs the normal correction process and a correction process C.

FIG. 11 is a flowchart showing an example in which the frame rate conversion unit 12 according to the third embodiment performs the normal correction process and the correction process C.

First, the frame rate conversion unit 12 determines whether the FB exists in the first to third areas of the current group at 180 P (Step S21). If the FB does not exist in the first to third areas of the current group, the frame rate conversion unit 12 performs the normal correction process of averaging the first to third areas (Step S26), and terminates the process.

If the FB exists in the first to third areas, the frame rate conversion unit 12 determines whether the FB starts in the third area of the preceding group (Step S22). If the FB starts in the third area of the preceding group, the frame rate conversion unit 12 performs the correction process C for averaging the second and third areas of the current group and the first area of the subsequent group (Step S25), and terminates the process.

In Step S22, if the FB does not start in the third area of the preceding group, the frame rate conversion unit 12 determines whether the FB starts in the third area of the current group (Step S23). If the FB does not start in the third area of the preceding group and starts in the first or second area of the current group, the frame rate conversion unit 12 performs the normal correction process for averaging the first to third areas (Step S26), and terminates the process.

If the FB starts in the third area of the current group, frame rate conversion unit 12 discards the first area of the current group (Step S24), performs the correction process C for averaging the second and third areas of the current group and the first area of the subsequent group (Step S25), and terminates the process.

Figure 12A:
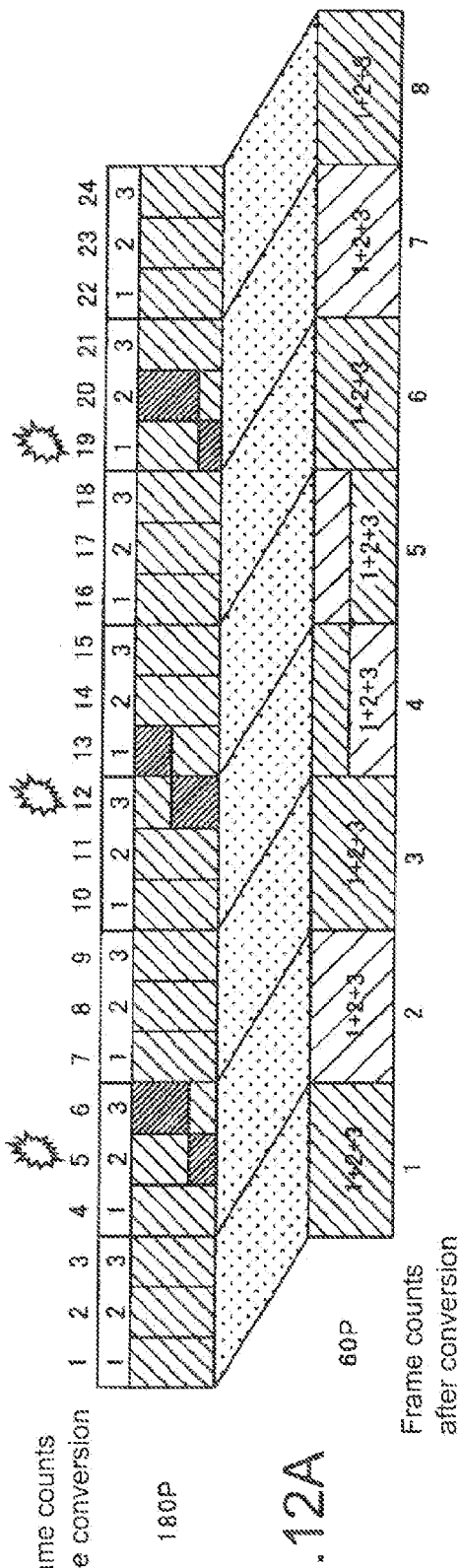
FIGS. 12A and 12B are explanatory diagrams each showing an example of the correction process to be performed in the case of a single FB in the third embodiment of the present disclosure.
Figure 12B:
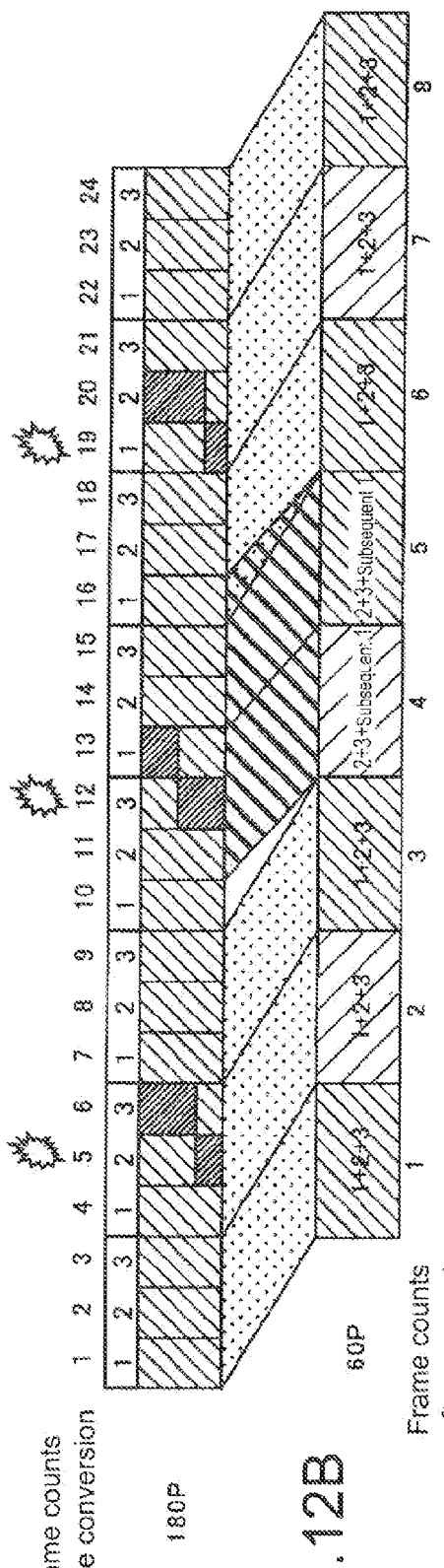

FIGS. 12A and 12B are explanatory diagrams each showing an example of the correction process to be performed in the case of a single FB. FIG. 12A shows a correction example for a single FB in related art. FIG. 12B shows a correction example of a single FB according to the third embodiment. The frame rate conversion unit 12 shown in FIG. 12A sets the correction process for the single FB according to the third embodiment to be off (invalid) and performs the normal FB correction process.

FIG. 12A shows that, out of the frames at 180 P, the flash is used in the 5th, 12th, and 19th frames, and the single FB starts therein. In related art, image data of continuous three frames, such as the 1st to 3rd frames and the 4th to 6th frames, which are included in the current group, is averaged to correct the FB. Therefore, the 2nd frame at 60 P after the conversion of the frame rate becomes a frame obtained by averaging the 4th to 6th frames at 180 P. Further, for the 19th frame at 180 P, the FB starts in the first area of the current group and ends in the 20th frame as the second area, so the 7th frame at 60 P is a frame obtained by averaging the 19th to 21st frames at 180 p. However, for the 12th frame at 180 P, the FB starts in the third area of the current group and ends in the first area of the subsequent group, so the FB is generated in the 4th and 5th frames at 60 P.

Therefore, as shown in FIG. 12B, the FB correction process of the frame rate conversion unit 12 is set to be on (valid). At this time, when the FB starts in the 12th frame at 180 P, in the 4th frame at 60 P, the 10th frame included in the current group at 180 P is discarded, and the 11th and 12th frames of the current group and the 13th frame of the subsequent group are averaged. Further, the 5th frame at 60 P is a frame obtained by averaging the 14th and 15th frames of the current group at 180 P and the 16th frame of the subsequent group.

By the FB correction apparatus 10 according to the third embodiment described above, in the case where the flash is used in the third area of the current group, and the single FB starts, the frame rate conversion unit 12 performs the correction process C for averaging the second and third areas of the current group and the first area of the subsequent group. In this way, the FB is corrected in real time, with the result that it is possible to effectively suppress the occurrence of the FB and make the FB inconspicuous in the frames after the conversion from 180 P to 60 P.

4. Fourth Embodiment

Example of Process for Correcting Multi FB when Frame Rate is Converted from 180 P to 60 P Next, with reference to FIGS. 13 to 16, a description will be given on an example of an FB correction process according to a fourth embodiment of the present disclosure in the case where the flash is used in a plurality of frames in a row.

FIGS. 13A to 13E are explanatory diagrams each showing an example of a correction process at a time when the frame rate conversion unit 12 according to the fourth embodiment converts the frame rate from 180 P to 60 P. FIGS. 13A to 13C are the same as FIGS. 10A to 10C, respectively. FIGS. 13D and 13E respectively show correction processes D and E for adding the second and third areas of the current group to each other and extending the added areas to be 1.5 times in the case where the FB starts in the third area of the preceding group.

Conditions for correcting the FB by the frame rate conversion unit 12 according to the fourth embodiment are defined as follows. Here, the normal correction process and the correction process C shown in FIGS. 13A and 13C, respectively, are the same as the processes performed by the frame rate conversion unit 12 according to the third embodiment, so the description thereof will be omitted.

(1) Normal Correction Process

In the case where the FB starts in the first area of the current group, and the state is not as shown in FIGS. 13C and 13D, the frame rate conversion unit 12 performs a process for averaging the first to third areas of the current group at 180 P as the current frame at 60 P (FIG. 13B).

(2) Correction Process D

In the case where the FB starts in the third area of the preceding group and ends in the first area of the current group, and the FB is not generated in the second and third areas of the current group, the second and third areas of the current group are added and extended to be 1.5 times by the frame rate conversion unit 12 (FIG. 13D).

(3) Correction Process E

In the case where the FB starts in the third area of the preceding group and ends in the first area of the current group, and the FB starts in the second area of the current group and ends in the third area of the current group, the second and third areas of the current group are added and extended to be 1.5 times by the frame rate conversion unit 12 (FIG. 13E).

As a result, in addition to the process performed by the frame rate conversion unit 12 according to the third embodiment, in the case where the FB starts in the third area of the preceding group and ends in the first area of the current group, the frame rate conversion unit 12 according to the fourth embodiment extends the second and third areas of the current group to be 1.5 times and performs averaging, thereby converting the frame rate to ⅓ thereof.

Figure 14:
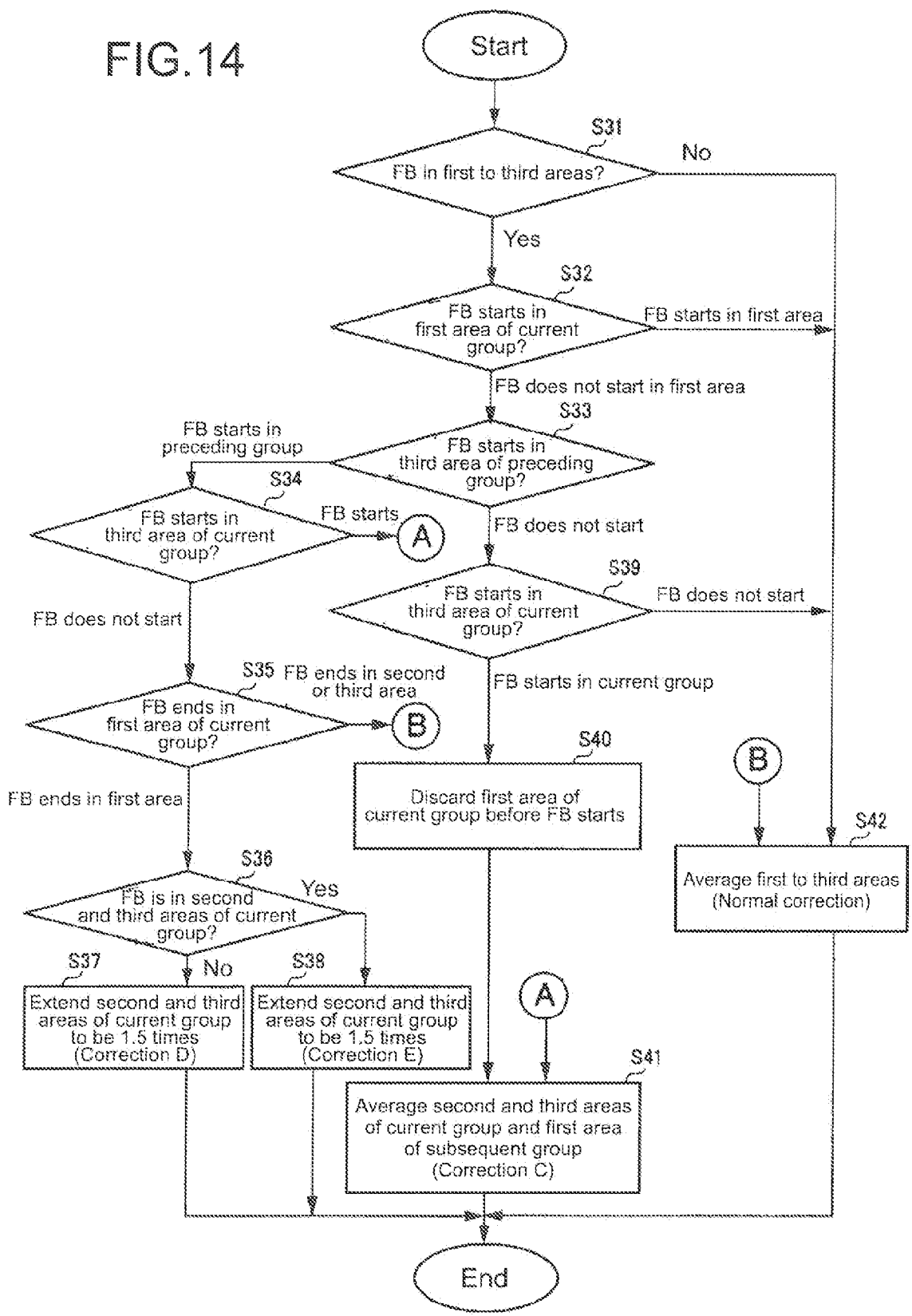
FIG. 14 is a flowchart showing an example in which the frame rate conversion unit according to the fourth embodiment of the present disclosure performs the normal correction process, the correction process C, and correction processes D and E.

FIG. 14 is a flowchart showing an example in which the frame rate conversion unit 12 according to the fourth embodiment performs the normal correction process and the correction processes C, D, and E.

First, the frame rate conversion unit 12 determines whether the FB exists in the first to third areas of the current group at 180 P (Step S31). If the FB does not exist in the first to third areas, the frame rate conversion unit 12 performs the normal correction process of averaging the first to third areas (Step S42), and terminates the process.

If the FB exists in the first to third areas of the current group, the frame rate conversion unit 12 determines whether the FB starts in the first area of the current group (Step S32). If the FB starts in the first area of the current group, the frame rate conversion unit 12 performs the normal correction process (Step S42), and terminates the process.

If the FB does not start in the first area of the current group, the frame rate conversion unit 12 determines whether the FB starts in the third area of the preceding group (Step S33). In the case where the FB starts in the third area of the preceding group, the frame rate conversion unit 12 determines whether the FB starts in the third area of the current group (Step S34). In the case where the FB starts in the third area of the current group, the frame rate conversion unit 12 performs the correction process C for averaging the second and third areas of the current group and the first area of the subsequent group (Step S41), and terminates the process.

In the case where the FB does not start in the third area of the current group, the frame rate conversion unit 12 determines whether the FB ends in the first area of the current group (Step S35). In the case where the FB ends in the second or third area of the current group, the frame rate conversion unit 12 performs the normal correction process (Step S42), and terminates the process.

If the FB ends in the first area of the current group, the frame rate conversion unit 12 determines whether the FB exists in the second and third areas of the current group (Step S36). If the FB does not exist in the second and third areas of the current group, the frame rate conversion unit 12 performs the correction process D for extending the second and third areas of the current group to be 1.5 times (Step S37), and terminates the process. On the other hand, if the FB exists in the second and third areas of the current group, the frame rate conversion unit 12 performs the correction process E for extending the second and third areas of the current group to be 1.5 times (Step S38), and terminates the process.

In Step S33, in the case where the FB does not start in the third area of the preceding group, the frame rate conversion unit 12 determines whether the FB starts in the third area of the current group (Step S39). In the case where the FB does not start in the third area of the current group, the frame rate conversion unit 12 performs the normal correction process (Step S42), and terminates the process.

In the case where the FB starts in the third area of the current group, the frame rate conversion unit 12 discards the first area of the current group before the FB starts (Step S40), performs the correction process C for averaging the second and third areas of the current group and the first area of the subsequent group (Step S41), and terminates the process.

Figure 15A:
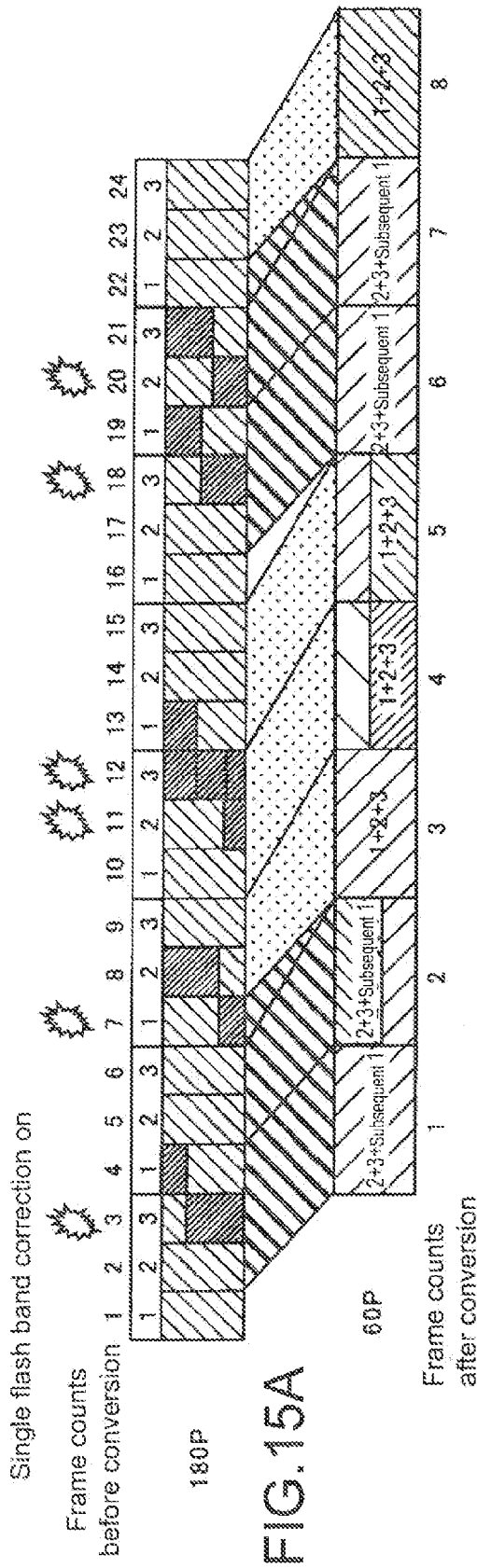
FIGS. 15A and 15B are explanatory diagrams each showing an example of performing the correction process for the multi FB by the frame rate conversion unit according to the fourth embodiment of the present disclosure.
Figure 15B:
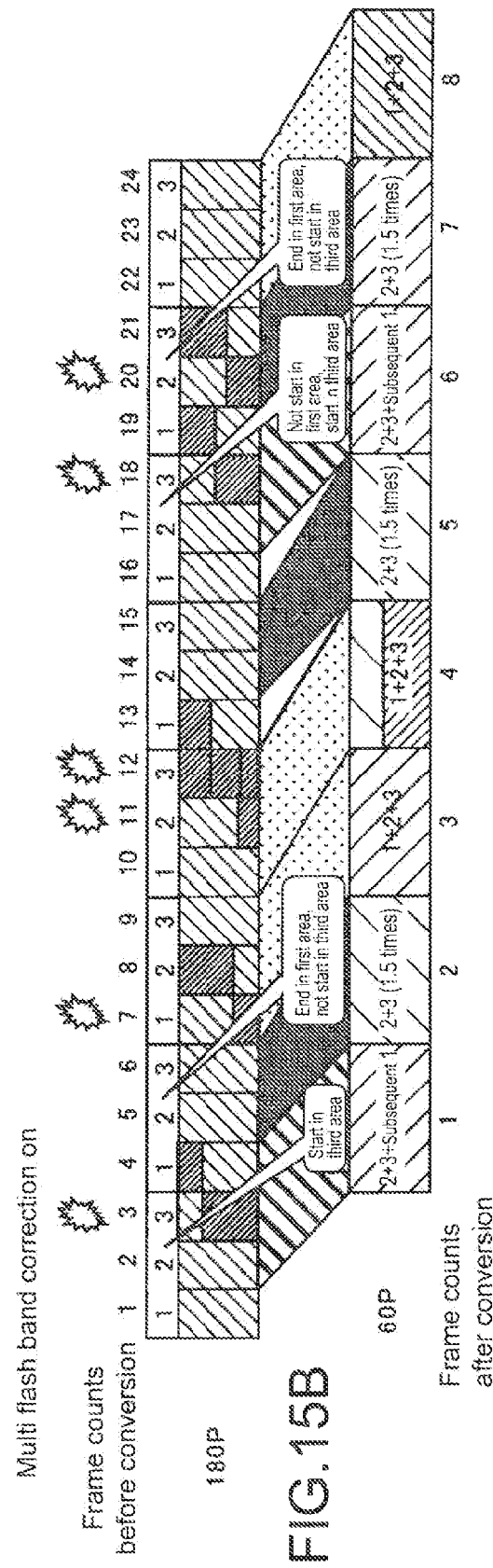

FIGS. 15A and 15B are explanatory diagrams each showing an example of performing the correction process for the multi FB by the frame rate conversion unit 12 according to the fourth embodiment. FIG. 15A shows a correction example for the single FB as in the third embodiment. FIG. 15B shows a correction example for the multi FB according to the fourth embodiment.

As shown in FIG. 15A, out of the frames at 180 P, the flash is used in the 3rd, 7th, 11th, 12th, 18th, and 20th frames, and the FB starts therein. Here, when the frame rate conversion unit 12 performs the correction process as in the third embodiment, the FB that starts in the 3rd frame at 180 P is averaged with the 2nd and 3rd frames of the current group and the 4th frame of the subsequent group through the correction process C.

Here, the FB that starts in the 11th frame at 180 P is averaged in the 10th to 12th frames at 180 P through the normal correction process. However, the FB is also generated in the 12th frame at 180 P, so the FB ends in the 13th frame. At this time, in the 5th frame at 60 P, the FB generated in the 13th frame at 180 P appears.

Here, as shown in FIG. 15B, the correction process for the multi FB according to the fourth embodiment is set to be on (valid), to correct the multi FB. At this time, the frames at 180 P are corrected as follows, thereby generating frames at 60 P.

Because the FB starts in the 3rd frame at 180 P, the 1st frame at 60 P is a frame obtained by averaging the 2nd to 4th frames at 180 p through the correction process C.

Because the FB ends in the 4th frame at 180 P, the 2nd frame at 60 P is a frame obtained by extending the 5th and 6th frames at 180 P to be double through the correction process D.

The 3rd frame at 60 P is a frame obtained by averaging the 7th to 9th frames at 180 P through the normal correction process.

The 4th frame at 60 P is a frame obtained by averaging the 10th to 12th frames at 180 P through the normal correction process.

Because the FB ends in the 13th frame at 180 P, and the FB does not appear in the 14th and 15th frames, the 5th frame at 60 P is a frame obtained by extending the 14th and 15th frames at 180 P to be 1.5 times through the correction process D. Here, the 13th frame at 180 P is discarded.

The 6th frame at 60 P is a frame obtained by averaging the 17th to 19th frames at 180 P through the correction process C. Here, the 16th frame at 180 P is discarded.

Because the FB ends in the 19th frame at 180 P, and the FB appears in the 20th and 21st frames, the 7th frame at 60 P is a frame obtained by extending the 20th and 21st frames at 180 P to be 1.5 times through the correction process E.

The 8th frame at 60 P is a frame obtained by averaging the 22nd to 24th frames at 180 P through the normal correction process.

Figure 16:
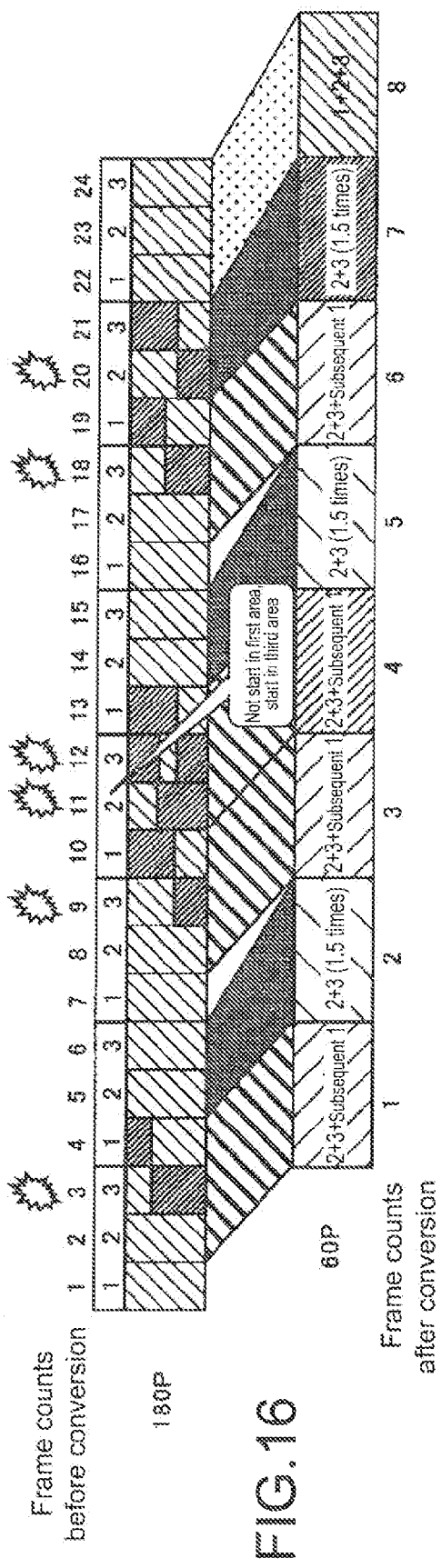
FIG. 16 is an explanatory diagram showing another example of a correction process for the multi FB performed by the frame rate conversion unit according to the fourth embodiment of the present disclosure.

FIG. 16 is an explanatory diagram showing another example of a correction process for the multi FB performed by the frame rate conversion unit 12 according to the fourth embodiment. The upper part of FIG. 16 shows an example of the frames at 180 P, and the lower part of FIG. 16 shows an example of the frames at 60 P.

In the 3rd, 9th, 11th, 12th, 18th, and 20th frames at 180 P, the flash is used. Therefore, in the 3rd, 4th, 9th to 13th, and 18th to 21st frames at 180 P, the FB is generated.

First, because the FB starts in the 3rd frame at 180 P, the 1st frame at 60 P is a frame obtained by averaging the 2nd to 4th frames at 180 P through the correction process C.

The 2nd frame at 60 P is a frame obtained by extending the 5th and 6th frames at 180 P to be 1.5 times through the correction process D.

The 3rd frame at 60 P is a frame obtained by averaging the 8th to 10th frames at 180 P through the correction process C.

The 4th frame at 60 P is a frame obtained by averaging the 11th to 13th frames at 180 P through the correction process C.

The 5th frame at 60 P is a frame obtained by extending the 14th and 15th frames at 180 P to be 1.5 times through the correction process D. At this time, the 16th frame at 180 P is discarded.

The 6th frame at 60 P is a frame obtained by averaging the 17th to 19th frames at 180 P through the correction process C.

The 7th frame at 60 P is a frame obtained by extending the 20th and 21st frames at 180 P to be 1.5 times through the correction process E. At this time, the 19th frame at 180 P is discarded.

The 8th frame at 60 P is a frame obtained by averaging the 22nd to 24th frames at 180 P through the normal correction process.

By the FB correction apparatus 10 according to the fourth embodiment described above, in the case where the flash is used in the third area of the preceding group, and the FB ends in the first area of the current group, the frame rate conversion unit 12 performs the correction processes D and E for extending the second and third areas of the current group to be 1.5 times. Thus, in addition to the correction process C according to the third embodiment described above, the correction processes D and E are performed, thereby performing the correction for the multi FB in real time and making the FB generated in the frames at 60 P inconspicuous in the process for converting the frame rate from 180 P to 60 P.

As described above, by the FB correction apparatus according to the first to fourth embodiments, when the frame rate conversion unit 12 performs the frequency conversion of the frame rate of the image data taken at an HFR of double or more to a lower frame rate, it is possible to erase the FB from the image data after the conversion. At this time, by adjusting the permutation of the frames to be combined, it is possible to make the FB inconspicuous. In particular, in the case where the image data is distributed as a live video, it is necessary to prevent delay as much as possible. Therefore, for example, by using a CMOS sensor or the like as an image pickup element, it is possible to perform a correct process for the FB generated in an image taken by a rolling scanning system in real time with a little delay.

5. Modified Example

It should be noted that the description is given on the examples of the process for converting the frame rate from 120 P to 60 P in the first and second embodiments and from 180 P to 60 P in the third and fourth embodiments described above, but the frame rates before and after the conversion are not limited to those values. Further, another element may be used instead of a CMOS sensor as long as an image pickup element that uses the rolling scanning system is used.

Further, the image data that is input to the FB detection unit 11 is desired to be a progressive signal, but the image data that is output by the frame rate conversion unit 12 may be an interlaced signal in addition to the progressive signal. Therefore, the system of an image signal output by the frame rate conversion unit 12 may be arbitrarily changed in accordance with a type of a monitor on which the image is displayed.

Furthermore, in the FB correction apparatus 10 according to the first to fourth embodiments described above, the blocks are each configured by hardware but may be implemented by software. Here, the structure of an FB correction apparatus 20 to be implemented by software will be described.

Figure 17:
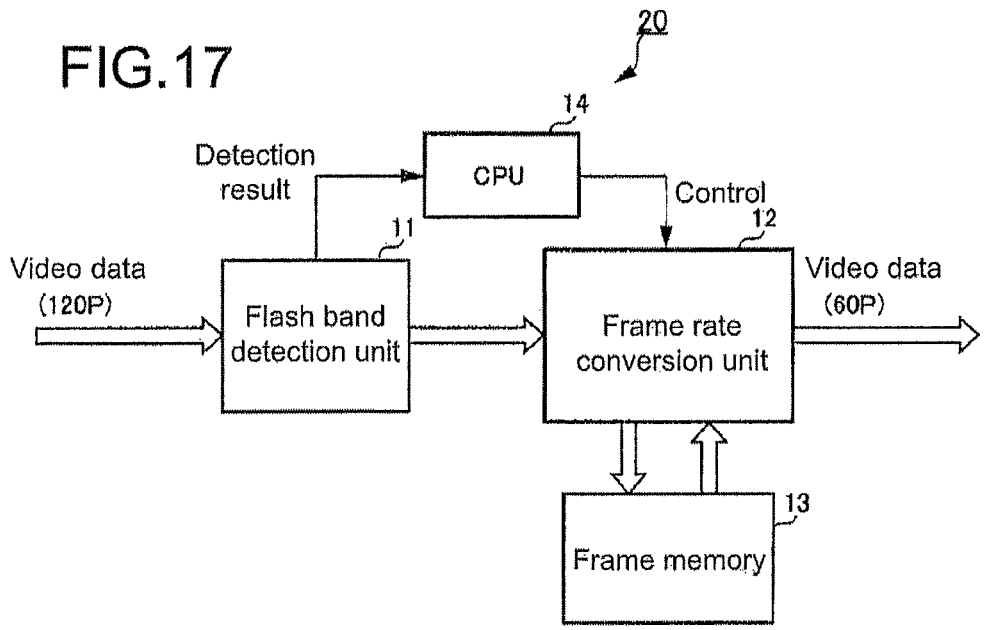
FIG. 17 is a block diagram showing a modified example of an FB correction apparatus according to another embodiment of the present disclosure.
Figure 18A:
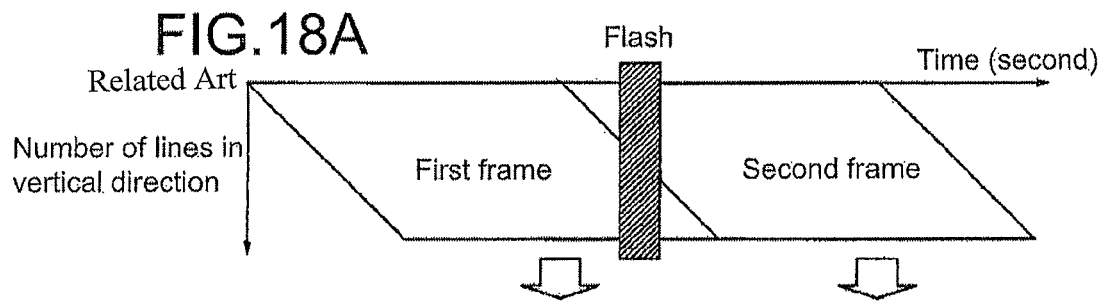
FIGS. 18A and 18B are explanatory diagrams showing an example of an FB generated in a frame in related art.
Figure 18B:
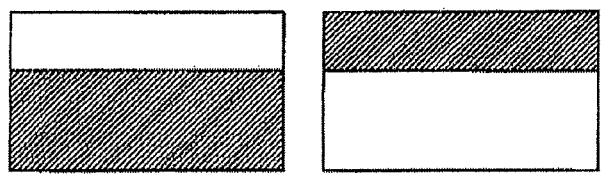

FIG. 17 is a block diagram showing an example of the internal structure of the FB correction apparatus 20.

Like the FB correction apparatus 10 described above, the FB correction apparatus 20 is provided with the FB detection unit 11, the frame rate conversion unit 12, and the frame memory 13. The FB correction apparatus 20 is further provided with a control unit 14 that processes a detection result of the FB detection unit 11 to control an operation of the frame rate conversion unit 12. For the control unit 14, a central processing unit (CPU) is used, for example. As described above, by controlling the operation of the FB correction apparatus 20 by software, it is possible to make processes performed by the frame rate conversion unit 12 complex.

In addition, in the case where a series of processes in the above embodiments are performed by software, it is possible to perform the processes by a computer in which programs that constitute the software are incorporated in dedicated hardware or a computer in which programs for executing various functions are installed. For example, the processes may be executed by installing programs that constitute desired software to a general-purpose personal computer or the like.

In addition, a recording medium in which a program code of software that implements the functions of the above embodiments is recorded may be supplied to a system or an apparatus. Also, the functions are of course implemented by reading and executing the program code stored in the recording medium by a computer (or control apparatus such as a CPU or the like) of the system or the apparatus.

Examples of the recording medium for supplying the program code in this case include a flexible disk, a hard disk, an optical disk, a magnetic optical disk, a CD-ROM, a CD-R, a magnetic tape, a nonvolatile memory card, a ROM, and the like.

Further, by executing the program code read by the computer, the functions in the above embodiments are implemented. In addition, on the basis of an instruction of the program code, an OS or the like that is operated on the computer partially or entirely performs actual processes. The case where the functions in the above embodiments are implemented through the processes is included.

In addition, the present disclosure is not limited to the above embodiments and may of course have various applications or modified examples without departing from the gist of the present disclosure.

It should be noted that the present disclosure can take the following configurations.

(1) A flash band correction apparatus, including:
a flash band detection unit configured to detect a start line and an end line of a flash band in a frame on the basis of a difference in an exposure period for each line of an image signal output for each frame at a predetermined frame rate by an image pickup element with a rolling shutter system, the flash band being an unevenness in brightness level for each line which is generated in the frame due to flash light; and
a frame rate conversion unit configured to determine a combination of the frames of the image signal before a frame rate is converted on the basis of the start line and the end line and convert the frame rate to 1/n thereof.

(2) The flash band correction apparatus according to Item (1), in which
the frame rate conversion unit is configured to set, in a case where the frame rate before conversion is double the frame rate after the conversion, a plurality of frames at the frame rate before the conversion, which precede by one frame at the frame rate after the conversion, as a current group, set frames at the frame rate before the conversion, which follow the current group, as a subsequent group, average, in one of a case where the flash band does not exist in the current group and a case where the flash band starts in a first area of the current group, the first area of the current group and a second area subsequent to the first area, and average, in a case where the flash band starts in the second area of the current group, the second area of the current group and a first area of the subsequent group and convert the frame rate to ½.

(3) The flash band correction apparatus according to Item (1) or (2), in which
the frame rate conversion unit is configured to set the frames at the frame rate before the conversion, which precede the current group, as a preceding group, average, in a case where the flash band starts in a second area of the preceding group and ends in the second area of the current group, the first and second areas of the current group, average, in a case where the flash band starts in the second area of the current group and ends in the first area of the subsequent group, the second area of the current group and the first area of the subsequent group, extend, in the case where the flash band starts in the second area of the preceding group and ends in the first area of the current group, the second area of the current group to be double, and convert the frame rate to ½ thereof.

(4) The flash band correction apparatus according to Item (1), in which
the frame rate conversion unit is configured to set, in a case where the frame rate before conversion is three-times the frame rate after the conversion, a plurality of frames at the frame rate before the conversion, which precede by one frame at the frame rate after the conversion, as a current group, set frames at the frame rate before the conversion, which follow the current group, as a subsequent group, average, in one of a case where the flash band does not exist in the current group and a case where the flash band starts in one of a first area and a second area of the current group, the first area, the second area, and a third area of the current group, and average, in a case where the flash band starts in the third area of the current group and ends in a first area of the subsequent group, the second area and the third area of the current group and the first area of the subsequent group and convert the frame rate to ⅓ thereof.

(5) The flash band correction apparatus according to Item (1) or (4), in which
the frame rate conversion unit is configured to set the frames at the frame rate before the conversion, which precede the current group, as a preceding group, extend, in a case where the flash band starts in a third area of the preceding group and ends in the first area of the current group, the second area and the third area of the current group to be 1.5 times and average the areas, and convert the frame rate to ⅓ thereof.

(6) A flash band correction method, including:
detecting a frame in which a flash band occurs by a start line and an end line of the flash band on the basis of a difference in an exposure period for each line of an image signal output for each frame at a predetermined frame rate by an image pickup element with a rolling shutter system, the flash band being an unevenness in brightness level for each line which is generated in the frame due to flash light; and
determining a combination of the frames of the image signal before a frame rate is converted on the basis of the start line and the end line of the flash band detected and converting the frame rate to 1/n thereof.

(7) An image pickup apparatus, including:
a flash band correction apparatus including
a flash band detection unit configured to detect a frame in which a flash band occurs by a start line and an end line of the flash band on the basis of a difference in an exposure period for each line of an image signal output for each frame at a predetermined frame rate by an image pickup element with a rolling shutter system, the flash band being an unevenness in brightness level for each line which is generated in the frame due to flash light, and a frame rate conversion unit configured to determine a combination of the frames of the image signal before a frame rate is converted on the basis of the start line and the end line of the flash band detected and convert the frame rate; and
an image pickup processing unit configured to perform a predetermined process for image data including the frame, the frame rate of which is converted to 1/n thereof.

The present disclosure contains subject matter related to that disclosed in Japanese Priority Patent Application JP 2012-028450 filed in the Japan Patent Office on Feb. 13, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A flash band correction apparatus, comprising:
a flash band detection unit configured to detect a start line and an end line of a flash band in a frame on the basis of a difference in an exposure period for each line of an image signal output for each frame at a predetermined frame rate by an image pickup element with a rolling shutter system, the flash band being an unevenness in brightness level for each line which is generated in the frame due to flash light; and
a frame rate conversion unit configured to determine a combination of the frames of the image signal before a frame rate is converted on the basis of the start line and the end line and convert the frame rate to 1/n thereof;
the frame rate conversion unit being further configured to set a group of frames at the frame rate before the conversion, which precede a current group of frames, as a preceding group, and a group of frames at the frame rate before the conversion, which follow the current group of frames, as a subsequent group,
wherein, in a case where the frame rate before conversion is double the frame rate after conversion, the frame rate conversion unit is configured
to average first and second areas of the current group, where the flash band starts in the second area of the preceding group and ends in the second area of the current group,
to average the second area of the current group and the first area of the subsequent group where the flash band starts in the second area of the current group and ends in the first area of the subsequent group,
to extend the second area of the current group to be double in the case where the flash band starts in the second area of the preceding group and ends in the first area of the current group, and
to convert the frame rate to ½ thereof.

2. The flash band correction apparatus according to claim 1, wherein
the frame rate conversion unit is configured, in the case where the frame rate before conversion is double the frame rate after conversion,
to average the first area of the current group and a second area subsequent to the first area, for the case where the flash band does not exist in the current group or for the case where the flash band starts in the first area of the current group, and
to average the second area of the current group and the first area of the subsequent group, for the case where the flash band starts in the second area of the current group, and to convert the frame rate to ½ thereof.

3. The flash band correction apparatus according to claim 1, wherein
the frame rate conversion unit is configured, in a case where the frame rate before conversion is three-times the frame rate after the conversion, to average, in one of a case where the flash band does not exist in the current group and a case where the flash band starts in one of a first area and a second area of the current group, the first area, the second area, and a third area of the current group, average, in a case where the flash band starts in the third area of the current group and ends in a first area of the subsequent group, the second area and the third area of the current group and the first area of the subsequent group, and convert the frame rate to ⅓ thereof.

4. The flash band correction apparatus according to claim 3, wherein
the frame rate conversion unit is configured, in the case where the frame rate before conversion is three-times the frame rate after conversion, to extend, in a case where the flash band starts in a third area of the preceding group and ends in the first area of the current group, the second area and the third area of the current group to be 1.5 times and average the areas, and convert the frame rate to ⅓ thereof.

5. A flash band correction method, comprising:
detecting a frame in which a flash band occurs by a start line and an end line of the flash band on the basis of a difference in an exposure period for each line of an image signal output for each frame at a predetermined frame rate by an image pickup element with a rolling shutter system, the flash band being an unevenness in brightness level for each line which is generated in the frame due to flash light;
determining a combination of the frames of the image signal before a frame rate is converted on the basis of the start line and the end line of the flash band detected and converting the frame rate to 1/n thereof;
setting a group of frames at the frame rate before the conversion, which precede a current group of frames, as a preceding group, and a group of frames at the frame rate before the conversion, which follow the current group of frames, as a subsequent group, and
in a case where the frame rate before conversion is double the frame rate after conversion,
averaging first and second areas of the current group, where the flash band starts in the second area of the preceding group and ends in the second area of the current group
averaging the second area of the current group and the first area of the subsequent group where the flash band starts in the second area of the current group and ends in the first area of the subsequent group,
extending the second area of the current group to be double in the case where the flash band starts in the second area of the preceding group and ends in the first area of the current group, and
converting the frame rate to ½ thereof.

6. An image pickup apparatus, comprising:
a flash band correction apparatus including
a flash band detection unit configured to detect a frame in which a flash band occurs by a start line and an end line of the flash band on the basis of a difference in an exposure period for each line of an image signal output for each frame at a predetermined frame rate by an image pickup element with a rolling shutter system, the flash band being an unevenness in brightness level for each line which is generated in the frame due to flash light, and
a frame rate conversion unit configured to determine a combination of the frames of the image signal before a frame rate is converted on the basis of the start line and the end line of the flash band detected and convert the frame rate;
the frame rate conversion unit being further configured to set a group of frames at the frame rate before the conversion, which precede a current group of frames, as a preceding group, and a group of frames at the frame rate before the conversion, which follow the current group of frames, as a subsequent group,
wherein, in a case where the frame rate before conversion is double the frame rate after conversion, the frame rate conversion unit is configured
to average first and second areas of the current group, where the flash band starts in the second area of the preceding group and ends in the second area of the current group,
to average the second area of the current group and the first area of the subsequent group where the flash band starts in the second area of the current group and ends in the first area of the subsequent group,
to extend the second area of the current group to be double in the case where the flash band starts in the second area of the preceding group, and ends in the first area of the current group, and
to convert the frame rate to ½ thereof; and
an image pickup processing unit configured to perform a predetermined process for image data including the frame, the frame rate of which is converted to 1/n thereof.

* * * * *